United States Patent
Ramanujan et al.

[11] Patent Number: 6,084,626
[45] Date of Patent: Jul. 4, 2000

[54] GRATING MODULATOR ARRAY

[75] Inventors: Sujatha Ramanujan, Pittsford; Andrew F. Kurtz; Alan C. G. Nutt, both of Rochester, all of N.Y.

[73] Assignee: Eastman Kodak Company, Rochester, N.Y.

[21] Appl. No.: 09/069,344

[22] Filed: Apr. 29, 1998

[51] Int. Cl.[7] .................................................. G02B 5/18
[52] U.S. Cl. ..................... 347/239; 347/241; 347/255; 347/256; 359/559; 359/566; 359/572; 385/2
[58] Field of Search ........................ 347/239, 241, 347/255, 256, 258; 359/558, 559, 566, 572; 385/16, 2, 22; 355/67

[56] References Cited

U.S. PATENT DOCUMENTS

| | | | |
|---|---|---|---|
| 4,281,904 | 8/1981 | Sprague et al. | 359/263 |
| 4,376,568 | 3/1983 | Sprague | 359/315 |
| 4,560,994 | 12/1985 | Sprague | 347/239 |
| 4,786,918 | 11/1988 | Thornton et al. | 347/239 |
| 4,887,104 | 12/1989 | Kitano et al. | 359/246 |
| 4,900,130 | 2/1990 | Haas | 359/198 |
| 5,061,049 | 10/1991 | Hornbeck | 359/224 |
| 5,311,360 | 5/1994 | Bloom et al. | 359/572 |
| 5,351,617 | 10/1994 | Williams et al. | 101/467 |
| 5,402,154 | 3/1995 | Shibaguchi et al. | 347/256 |
| 5,418,871 | 5/1995 | Revelli, Jr. et al. | 385/44 |
| 5,459,610 | 10/1995 | Bloom et al. | 359/572 |
| 5,517,359 | 5/1996 | Gelbart | 359/623 |
| 5,521,748 | 5/1996 | Sarraf | 359/321 |
| 5,619,245 | 4/1997 | Kessler et al. | 347/241 |
| 5,754,278 | 5/1998 | Kurtz | 355/67 |
| 5,808,657 | 9/1998 | Kurtz et al. | 347/239 |
| 5,832,148 | 11/1998 | Yariv | 385/16 |
| 5,887,089 | 3/1999 | Deacon et al. | 385/22 |

OTHER PUBLICATIONS

A. A. Blistanov et al, "Modulation and Conversion of Light in Lithium Niobate Crystals with a Regular Domain Structure," Sov. J. Quantum Electron. 16 (12), Dec. 1986, pp. 1678–1679.

*Primary Examiner*—N. Le
*Assistant Examiner*—Hai C. Pham
*Attorney, Agent, or Firm*—Nelson Adrian Blish

[57] ABSTRACT

A grating modulator array (40) is comprised of a plurality of modulator sites (41). Each modulator site (41) is comprised of a plurality of first poled regions (50) and a plurality of second poled regions (51) alternating with said first poled regions. A first electrode (48a) is attached to a first end of each of the modulator sites and a second electrode (48b) is attached to a second end of each of the modulator sites and each of the electrode pairs establishes a field in the poled regions of the modulator sites which causes a phase shift in polarized light incident on the modulator.

86 Claims, 17 Drawing Sheets

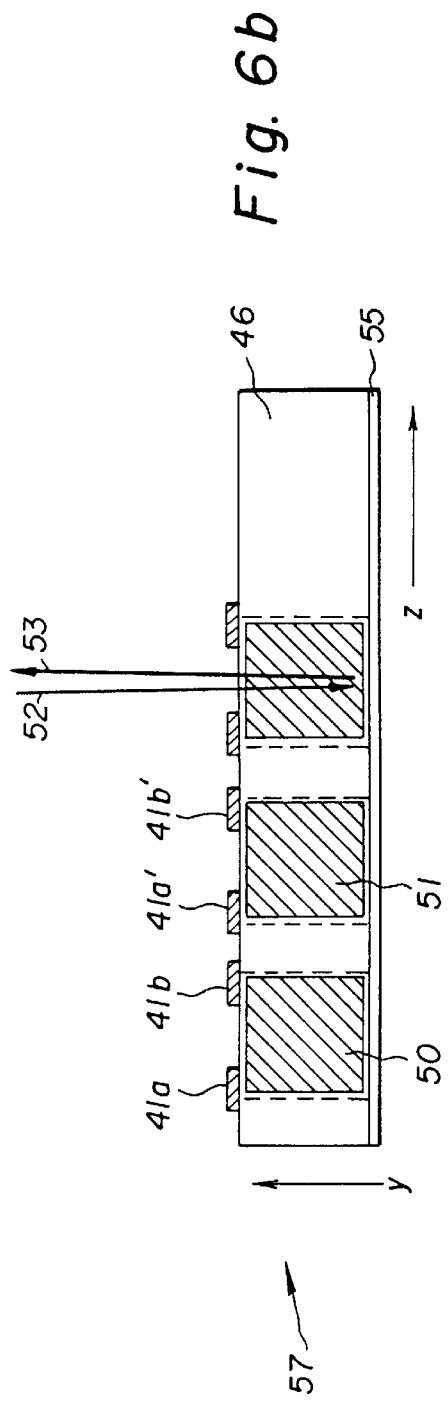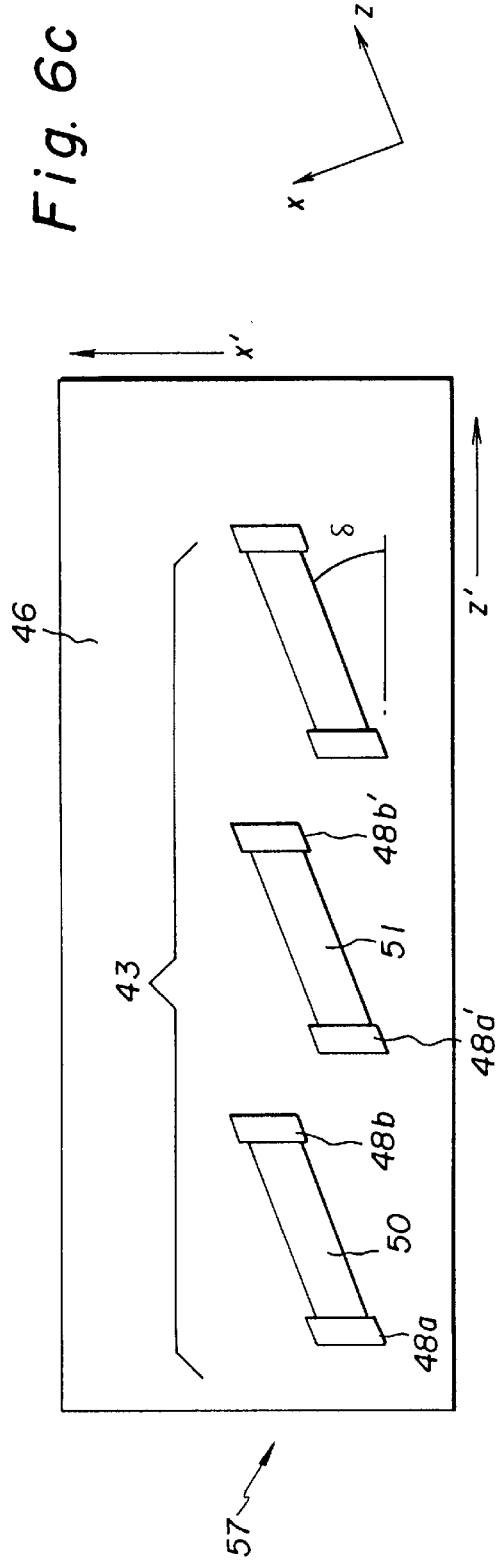

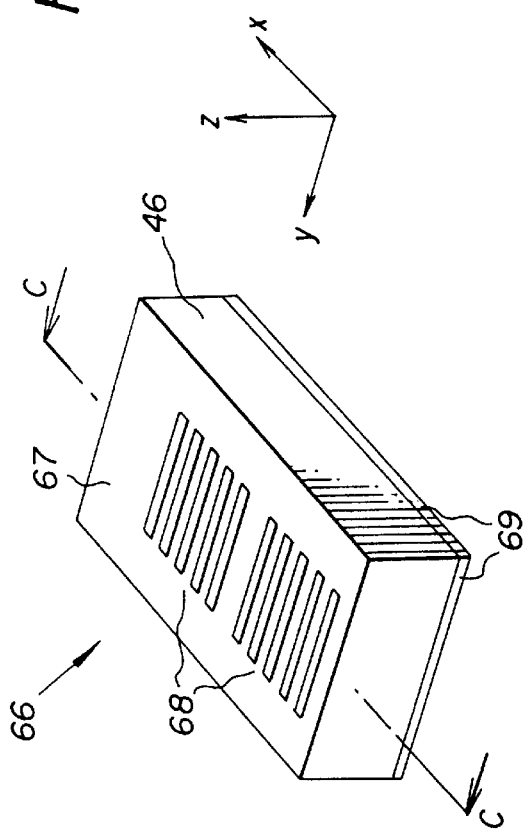
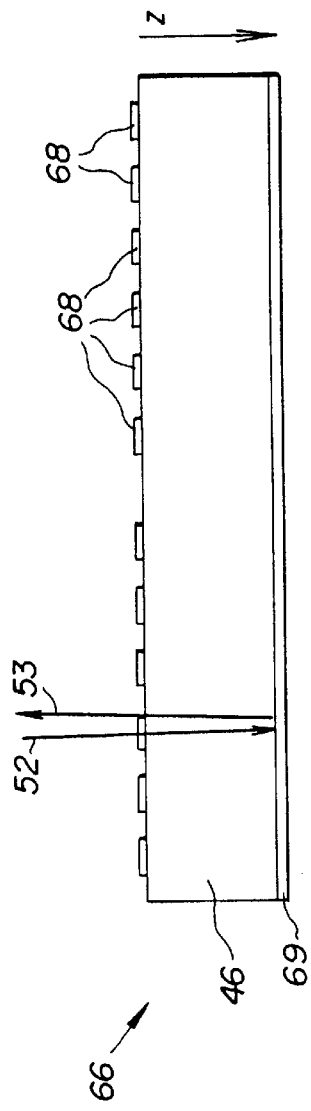

GRATING MODULATOR ARRAY

CROSS REFERENCE TO RELATED APPLICATIONS

The present application is related to U.S. patent application Ser. No. 08/757,889, filed Nov. 27, 1996, by Andrew F. Kurtz and David Kessler, entitled "A Laser Printer Using a Fly's Eye Integrator."

FIELD OF THE INVENTION

This invention relates generally to a method and apparatus for modulating a light beam, and in particular to a diffraction grating spatial light modulator array consisting of tightly packed elements.

BACKGROUND OF THE INVENTION

Laser printers are used in a wide variety of applications including office printing, medical printing, and bar code printing. These laser printers are available in a number of configurations depending on the use of the printer. For example, a flying spot printer typically uses a single, low power beam, to print to light sensitive media. It is often desirable, however, to print to a broader variety of media and with a higher pixel density.

Systems used in the graphic arts industry, for example, are configured as multispot printers to attain high productivity. Since most of the graphic arts media is relatively insensitive to light exposure, each of these incident beams must provide a high light level to a small spot at the media plane. These printers are typically configured like a lathe, where the page scan is obtained by rotating a drum which holds the media, and line scan by translating the multiple laser beams in a direction parallel to the axis of rotation of the drum.

There are several approaches to produce multiple writing spots in graphic arts printer designs. In one approach, each of the laser sources is separately coupled to optical fibers, which are then mounted to form a linear array of sources. Each of these channels can then be independently modulated. Such systems are described in U.S. Pat. Nos. 4,900,130 and 5,351,617. Another approach is to utilize a monolithic array of laser sources and then image the elements of the laser array directly onto the light sensitive media to produce multiple spots. Power to each element of the laser array is individually modulated to obtain modulator site densities. Such a system is described in U.S. Pat. No. 4,804,975 and is potentially of lower cost and higher efficiency than systems which couple lasers to optical fibers.

A monolithic printing system with a diode array source can be improved by splitting each lasing element into an array of subarray sources, such as described in U.S. Pat. No. 5,619,245. Thus, each modulator site is comprised of the combined light of all the lasing elements of a given subarray, and each of the subarrays are modulated to provide the image data input.

Another approach to improving a system with a monolithic diode array source is to combine the light from each lasing element to flood illuminate a linear spatial light modulator array. The modulator breaks up the light into image elements, and each modulator site is subsequently imaged onto the media plane to form the desired array of printing spots. Printing systems employing this approach are described in U.S. Pat. No. 4,786,918; U.S. Pat. No. 5,517,359; and U.S. Pat. No. 5,521,748. These systems improve on prior art designs by providing indirect light modulation, so that the laser diode array operates at full power, and serves only as a light source. Also, since light from the emitters overlap at the modulator, the resulting redundancy desensitizes the system to the failure of any the lasing elements within the array.

The performance of a system in which a linear spatial light modulator array is flood illuminated is highly dependent on both the design of the illumination system and the design and operation of the modulator array. Optimally, the illumination system should provide highly uniform illumination with minimal loss of brightness. In U.S. Pat. No. 4,786,918, the Gaussian beams from many single mode lasers are combined in the far field to create a broad and generally slowly varying illumination profile, but one which still falls off in a generally Gaussian manner. U.S. Pat. No. 5,517,359 provides for a printing system with a laser diode array consisting of multimode emitters, each of which typically has a non-uniform near field profile. A mirror system included in the illumination optics partially improves the light uniformity by substantially removing the macro-nonuniformities in the light profile. Another method, as described in U.S. patent application Ser. No. 08/757,889, filed Nov. 27, 1996, and assigned to the same assignee as the present invention, also describes a printing system with a laser diode array consisting of multimode emitters, but with an illumination system utilizing a fly's eye integrator. With the fly's eye integrator, both the micro and macro light non-uniformity can be substantially improved.

Since the illumination optics provide a uniform illumination of a linear spatial light modulator array, the overall system performance is highly dependent on the design and operation of the spatial light modulator array. Whether these devices are transmissive or reflective, light absorbing, light blocking, polarization altering, deflecting, or diffracting, a significant feature of their design is the presence of a high optical fill factor. That is, that the ratio of the width of the modulator site to the modulator site pitch approaches 100%. This is particularly important for graphic arts printers, where maximal efficiency with modest contrast (typically 20:1) is optimal. Light that is lost between modulator sites will reduce the system efficiency and writing contrast, and further, may damage the device.

There are several examples of electro-optical spatial light modulator arrays which have potential value in the design of a laser thermal printer. U.S. Pat. No. 4,887,104 describes an electro-optical linear modulator array using PLZT, wherein the linear array is broken into two rows of parallel, but offset sites which modulate the polarization state of the incident light. When a time delayed printing scheme is used, the two rows effectively reconstruct lines of image data. While the printed modulator sites are closely packed, the optical fill factor relative to the illumination system is low, and the system is inefficient. U.S. Pat. No. 5,402,154 describes a linear modulator array which provides a 100% fill factor by placing one row of 50% fill modulator sites on one side of an electro-optic sheet material with a second row of 50% fill modulator sites on the other side, but offset from those one the first side. However, the two sided manufacturing and assembly process for this device is quite complex, and furthermore PLZT is a notoriously difficult material to work with.

Another well known architecture for a electro-optical spatial light modulator array is the Total Internal Reflectance (TIR) modulator, described in U.S. Pat. No. 4,281,904 and U.S. Pat. No. 4,376,568. These devices are transmissive schlieren modulators, produced from lithium niobate ($LiNbO_3$) or lithium tantalate ($LiTaO_3$), which provide a high optical fill factor. The electro-optical materials used in these devices are robust, and because they are schlieren devices which redirect rather than absorb the modulated light, these modulators work well in laser thermal printers. However, the structure imposes severe constraints on the design of the input optical system, because the incident light must be directed at grazing incidence. Furthermore, the proximity of the exiting modulated and unmodulated light is not optimal for an imaging optical system when a high Lagrange light source is used. Such modulators are not easily adapted to two-dimensional arrangements of modulator sites or to multiple line illumination. Multiple line modulators, such as the modulator described in U.S. Pat. No. 4,560,994, require extremely complicated coupling optics, or a severe reduction in optical efficiency. U.S. patent application Ser. No. 08/763,174, filed Dec. 10, 1996, entitled "Addressable Electro-Optic Modulator with Periodically Poled Domain Regions" deals with TIR modulators.

Modulators that employ a waveguide geometry, see U.S. Pat. No. 5,418,871, and can tolerate high optical power density have been proposed for use in printing applications. However, the optical powers used in "Dye Submission Printing Technologies" are too large for most single mode or even multimode waveguide electro-optical crystals. Specifically, use of waveguiding in conjunction with an electro-optic material offers advantages for contrast and handling optical power. However, use of waveguide geometry requires specific input illumination angles. Even in the best case, waveguides experience considerable coupling losses. Furthermore, a waveguide is restricted to a one-dimensional array with relatively small cross-sectional geometry.

There are electromechanical modulator technologies which have potential utility for a laser thermal printer. For example, the DMD (digital mirror device), described in U.S. Pat. No. 5,061,049 can be constructed with a high fill factor by methods which lend themselves to mass production, however, this device is susceptible to damage in the case of high power illumination. The grating light valve, described in U.S. Pat. No. 5,311,360 and U.S. Pat. No. 5,459,610, is also a electromechanical diffractive schlieren modulator with a high fill factor and has demonstrated both fast rise and fall times, and a high fill factor. However, both micromechanical devices are limited in their ability to handle high optical power. Additionally, while establishing reasonably fast modulation times, neither is able to match the high speed modulation ability of electro-optic crystals.

In high power application, such as laser thermal printing, the schlieren type modulators, such as the grating light valves and the TIR modulators, are advantageous as they do not absorb the incident light, but rather deflect the modulated light out of the optical system. However, these modulators have not been optimally configured for use in a laser printer where the linear modulator array is flood illuminated by the light from a laser diode array.

SUMMARY OF THE INVENTION

It is an object of the present invention to provide a high pixel density at the media plane in a laser printing system. It is also an object of the present invention to provide a modulator capable of handling high power densities.

The present invention is directed to overcoming one or more of the problems set forth above. Briefly summarized according to one aspect of the present invention, a grating modulator array is comprised of a plurality of modulator sites. Each modulator site is comprised of a plurality of first poled regions, and second poled regions which alternate with the first poled regions. Electrodes are attached to each end of the modulator sites and establish a field in the poled regions to diffract incident light.

In one embodiment of the invention, the modulator sites are operated in schlieren mode as independently controlled diffraction gratings in which the high fill factor modulator sites are located in an electro-optical material with a predetermined crystal axis and periodically poled regions. The poled regions of one modulator site lie adjacent and parallel to the poled regions of the next adjacent modulator site.

In an alternate embodiment, the grating modulator array operates in a schlieren mode, and the poled regions are skewed such that the modulated light is deflected out of the plane of the unmodulated light.

Yet another embodiment of a grating modulator array has modulator sites which lie adjacent and co-linear to the poled regions of an adjacent modulator site and the surface electrodes.

An alternate embodiment of a grating modulator array has modulator sites operated in schlieren mode as independently controlled diffraction gratings, in which the modulator sites are part of an electro-optical material having an oriented crystal axis and a periodically poled substructure. The poled regions of one modulator site lie adjacent and parallel to the poled substructures of the next modulator site and electrode pairs are on the sides of the electro-optical material and influence the electro-optical material by means of bulk penetrating electrical fields.

A further embodiment of a grating modulator array has modulator sites operated in a schlieren mode as independently controlled diffraction gratings, in which the modulator sites are part of an electro-optical material with an oriented crystal. Regions of one modulator site lie adjacent and parallel to regions in each adjacent modulator site, and electrodes on a top surface and a bottom surface of the electro-optical material influence the electro-optical material by means of alternating electric fields.

In yet another embodiment, a laser printer has a grating modulator array operating in a diffractive schlieren mode with modulator sites skewed, such that modulated light is deflected out of the plane of the unmodulated light. In another embodiment, the grating modulator array consists of tightly packed modulator site elements of both normal and skewed modulator site orientations.

The above, and other objects, advantages and novel features of the present invention will become more apparent from the accompanying detailed description thereof when considered in conjunction with the following drawings.

BRIEF DESCRIPTION OF THE DRAWINGS

FIG. 2b is a cross-sectional view along lines A—A of the grating modulator array shown in FIG. 2a;

FIG. 6b is a cross-sectional view along lines B—B of the embodiment shown in FIG. 6a;

FIG. 6c is a top plan view of yet another embodiment of a modulator site with skewed regions;

FIG. 7b is a top plan view of the embodiment of the grating modulator array shown in FIG. 7a;

FIG. 8a is a perspective view of an alternate embodiment of a grating modulator array wherein a diffraction grating is formed by an electric field applied between transmissive electrode on a top surface of an electro-optic crystal with a common conducting layer on a bottom surface of the electro-optic crystal;

FIG. 8b is a cross-sectional view of along lines C—C of the embodiment shown in FIG. 8a;

DETAILED DESCRIPTION OF THE INVENTION

The present description will be directed in particular to elements forming part, or in cooperation more directly with an apparatus in accordance with the present invention. It is understood that elements not specifically shown or described may take various forms well known to those skilled in the art.

Figure 1:
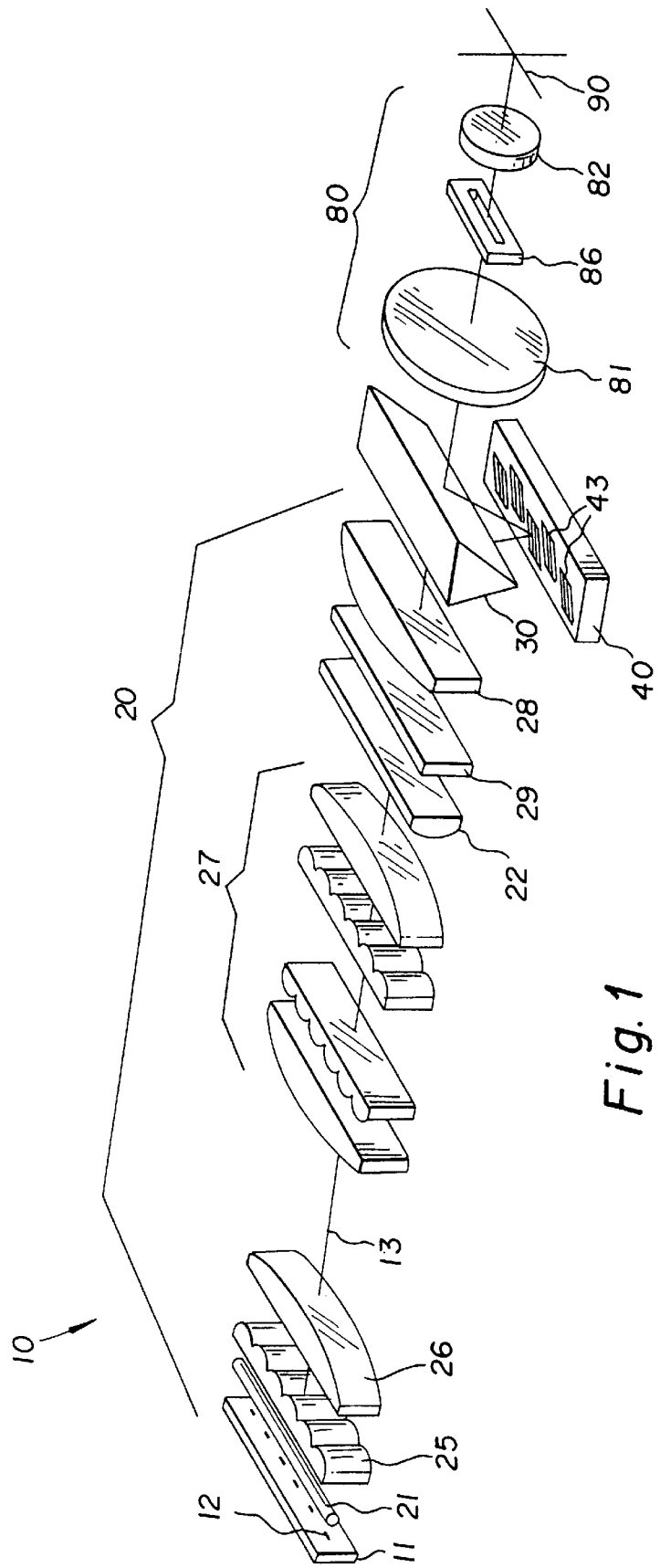
FIG. 1 is a perspective view of a laser printer according to the present invention.

Referring to FIG. 1, there is illustrated a laser printer referred to in general by numeral 10. The laser printer is comprised of a laser diode array 11, illumination optics 20, a grating modulator array 40 and a print lens 80. Laser printer 10 provides an image to a receiver, not shown, located at a media plane 90.

Laser diode array 11 is a high power array of laser diode emitters 12. The emitters 12 of the laser diode array are each activated simultaneously using a common power supply (not shown) in a Continuous Wave (CW) manner. The use of a CW laser without individual modulation simplifies the power supply and heat dissipation system.

All laser diode emitters 12 of the laser diode array 11, in combination with illumination optics 20 and the deflector 30, illuminate an area of a predetermined size on grating modulator array 40. In particular, the light from each of the diode emitters 12 is mapped by the illumination optics 20 to cover the full width of the grating modulator array 40, thereby providing source redundancy to reduce the sensitivity of the system to the malfunction of any one of the laser diode emitters 12.

The illumination optics 20 shown are anamorphic, meaning there are separate optical systems designed for the array and cross array directions. The anamorphic design is necessary because the emitters 12 have different output beam characteristics in the two directions, and because of the characteristics of grating modulator array 40, which is a linear array in the preferred embodiment, with a large length to width aspect ratio. The array and cross array optical systems are designed with different magnifications and with different beam handling characteristics, although axially symmetrical components with power in both directions could also be used.

The cross array elements consist of the cylindrical microlens 21 and cross array lens 22. Cross array lens 22 may consist of one or more lens elements. In general, these cross array elements are designed to confine the light within the narrow width of the grating modulator array 40, while minimizing the cross array numerical aperture (NA). This can be accomplished by imaging the laser diode emitters 12 to the grating modulator array, via deflector 30. Alternatively, the cylindrical micro-lens 21 can be imaged to the grating modulator array 40. These latter configurations assist in desensitizing the system to smile error, which is a deviation of the laser diode emitters 12 in the vertical direction, such that they are not located along a straight line. There are several methods by which smile can be corrected, including mounting the cylindrical micro-lens 21 along an arc.

The illumination optics 20 includes an array direction optical system, comprising laser lenslet array 25 and the combiner field lens 26, which magnify and image the emitters together in overlapping fashion. In the system of FIG. 1, these overlapped images occur at an intermediate illumination plane which is located at the input of the fly's eye integrator uniformizer assembly 27.

Fly's eye integrator uniformizer assembly 27 consists of two field lenses and two lenslet arrays. The light at the intermediate illumination plane is broken into L portions, where L is the number of lenslet elements in each of the lenslet arrays. These beam portions are then imaged and magnified by the second lenslet array and the second field lens of the fly's eye integrator uniformizer assembly 27, along with field lens 28, in overlapping fashion onto the grating modulator array 40, via deflector 30. As is described in U.S. patent application Ser. No. 08/757,889, the illumination of the spatial light modulator 40 provided by the illumination optics 20, which includes the fly's eye integrator uniformizer assembly 27, improves the light uniformity in the array direction. Alternately, the array optics are configured without the fly's eye integrator uniformizer assembly 27 and the laser lenslet array 25 and the combiner field lens 26 magnify and image the laser diode emitters 12 directly onto the grating modulator array 40 via deflector 30.

The modulator sites 43 for the devices described require properly oriented polarized light in order to function optimally. Therefore, a wave plate 29 can be placed prior to the grating modulator array in this embodiment to modify the incident polarization.

Grating modulator array 40 is a linear array of closely packed modulator sites 43, each of which is independently controlled. The array and cross array optics, working together, flood illuminate the spatial light grating modulator array 40 with a long, narrow line of light of uniform radiance, while preserving the brightness of the laser diode array source, less transmission and other losses. In particular, the line of illumination extends the full length of the grating modulator array 40 in the array direction, while illuminating a narrow width in the cross array direction, roughly equivalent to the width of the modulator sites 43. Grating modulator array 40 can either be a reflective device, as is shown in FIG. 1, or a transmissive device. When a transmissive grating modulator array is used, deflector 30 is not necessary. For example, grating modulator array 40 may consist of 256 modulator sites, each some 120 $\mu$m wide, for an overall modulator length of 31 mm.

Grating modulator array 40 is then imaged to media plane 90 by a print lens 80, via deflector 30, to create a line of closely packed writing spots. The print lens 80 is typically a multi-element assembly, which may either be axially symmetric or anamorphic. For simplicity, the print lens 80 of FIG. 1 is shown with two lens elements, print lens elements 81 and 82. Print lens element 81 acts as a field lens, to condense light within the clear aperture of the second print lens element 82. Print lens element 81 creates a fourier plane 85, see FIG. 3, at the aperture stop of the print lens 80 where a spatial filter 86 is located. The spatial filter 86 may be a slit, as is shown in FIG. 1, which passes the undiffracted light. Spatial filter 86 can also be a planar structure, or be an arc to match the non-paraxial profile of the aperture stop, thereby optimizing contrast or efficiency. Print lens element 82 images the grating modulator array 40 to the media plane 90.

The anamorphic nature of the design of the illumination optics 20 is motivated in part by the anamorphic nature of the light emitted by the laser diode array 11. A typical laser diode array is an OptoPower OPC-D020 laser, available from OptoPower Corporation, Tucson Ariz. This laser is a 20 watt laser consisting of 19 diode multimode laser emitter elements, each 150 $\mu$m wide, and spaced apart on a 650 $\mu$m pitch. This laser emits linearly polarized light at 830 nm with an array NA of 0.13 and a cross array NA of 0.63. Thus, the Lagrange invariant in the array direction is 0.312 mm, while in the cross array direction, with smile minimized, it is only 0.3 $\mu$m. Furthermore, unlike the array direction, where the emitters approximate miniature incoherent extended sources, in the cross array direction, the emitted beams are basically single spatial mode and Gaussian in nature.

In a system such as that of FIG. 1, where a high power laser is used as a source, the power densities of the light incident onto the spatial light modulator array 40 can be relatively high, for example, >1.0 kW/cm$^2$. In order for a modulator array to operate in such an environment, the basic construction must be robust, the optical fill factor should be high, approaching 100%, and the device should modulate the light with little absorption and easily shed the resulting heat load. Generally schlieren based devices, which deflect or diffract the light on a per modulator site basis according to command signals, are preferred because most of the modulated light is directed out of the optical system without being absorbed. Such devices can cause difficulty for the downstream optical system, as it must be designed to trade off modulation contrast with system efficiency.

Figure 2A:
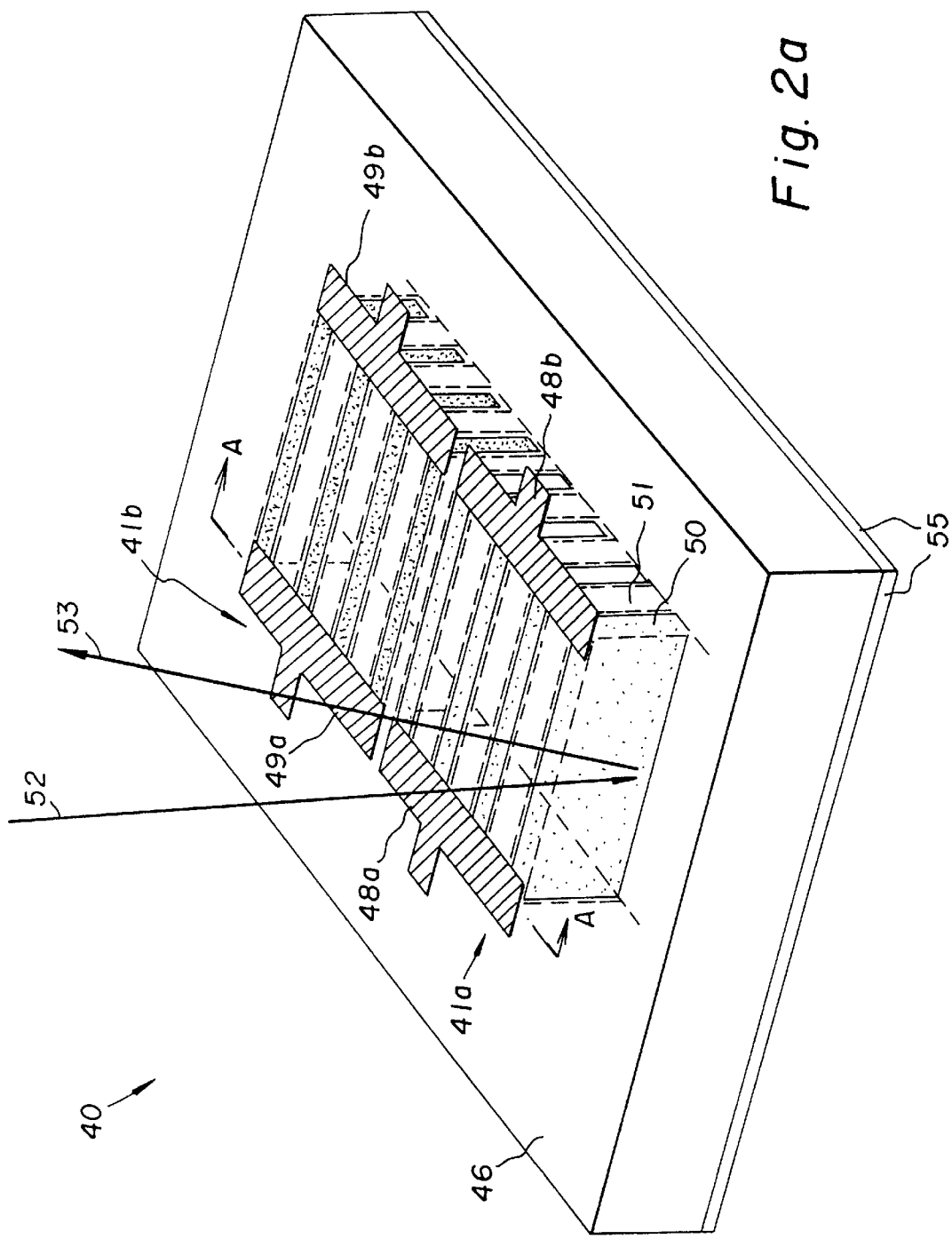
FIG. 2a is a perspective view, partially in phantom, of a grating modulator array with modulator sites comprised of periodically poled regions, oriented parallel and adjacent to the poled regions of the next modulator site.

In FIG. 2a, a preferred embodiment of grating modulator array 40 is shown, which is comprised of a bulk reflective, periodically poled, electro-optic material. For poling in multichannel modulators, periodically inverted domains are formed in a crystal. For example, doping material is provided through openings in a mask which chemically modifies the ferroelectric crystal in selected regions under the openings. After the doping process is completed, an electric field is applied to pole the domains to make them remain permanently in the poled position. A complete discussion of the process for forming periodically inverted domain regions in a crystal is found in C. Baron, H. Cheng and M. C. Gupta, "Domain Inversion in LiTaO$_3$ and LiNbO$_3$ by Electric Field Application on Chemically Patterned Crystals", Appl. Phys. Lett. 68 (4), 1996. Creation of a regular domain structure which can act as a phase grating has been demonstrated in "Modulation And Conversion Of Light In Lithium Niobate Crystals With A Regular Domain Structure," by A. A. Blistanov, A. Danilov, D. A. Rodianov, N. G. Sorokin, Yu G. Turkox, and S. I. Chizhikov, Kvant, Elektr. 13, pp. 2536–2538, 1986. This reversal of domains reduces the complexity of grating devices and reduces electrical crosstalk effects.

Dopant materials can be introduced by methods such as ion exchange, by immersion in selected acids and molten salts, such as pyrophosphoric and benzoic acids, heated to elevated temperatures and ion implantation followed by removal of the mask material by immersion in suitable solvents such as HF and dilute acid.

Periodically poled regions are often created parallel to the c-axis of the crystal but perpendicular to the surface. It is also possible to have the periodically poled regions parallel to the c-axis, the preferential growth axis of the crystal, but in the plane of the crystal. Also crystals with periodically poled regions have a much greater tolerance to high optical power levels as indicated in patent submission U.S. patent application Ser. No. 08/763,174, filed Dec. 10, 1996, entitled "Addressable Electro-Optic Modulator with Periodically Poled Domain Regions."

According to the present invention, see FIG. 2a, incident light 52 passes through a modulator sites 41, which is comprised of a portion of bulk electro-optic crystal 46, electrodes 48a and 48b, first poled regions 50 and second poled regions 51. The incident light 52, reflected by reflective surface 55, passes through poled regions 50, 51 of the modulator sites 41. Depending on whether the modulator site is modulated or not, electric fields will be formed between the two electrodes 48a and 48b, inducing phase differences in the light. The modulated phase diffracted light will be directed to impinge on a spatial filter structure within the print lens. The filter structure is established to optimize throughput for diffracted or undiffracted light associated with a specified voltage pattern.

This type of bulk, reflective, periodically poled electro-optic grating modulator array offers several advantages over the prior art modulators such as the TIR modulator and the deformable grating modulator. The bulk diffraction grating modulator may be used in either a reflective or a transmissive mode. In the reflective mode, the bulk reflective periodically poled electro-optic diffraction grating modulator array 40 is considerably less sensitive to the input angle of the incident light 52 than with the TIR modulator for which practical operation is limited to grazing angles with respect to the surface. Reflection in the bulk reflective periodically poled electro-optic diffraction grating modulator array 40 is dependent upon the reflective surface 55 on the back facet of the modulator. The light may enter at any angle within a large band of angles with respect to the surface and still be reflected back into the optical system.

The grating modulator array 40 also offers advantages to the optical system design over other electro-optic devices. For instance, the bulk reflective periodically poled electro-optic diffraction grating modulator array 40 more easily lends itself to two-dimensional area array modulator structures. Because the light is nearly normally incident, illumination of a two-dimensional array does not require the extent of crystal surface necessary for other geometries such as the TIR modulator. Reflection occurs anywhere off the broad reflective surface as opposed to within a narrow region determined by strict electrode placement. The device geometry also offers significant advantages over waveguide electro-optic geometry devices. Again, the acceptance angle of the grating modulator array 40 is quite large, thus reducing coupling losses significantly. The waveguide geometry is generally restricted to one-dimensional array structures within a single device, whereas the bulk geometry device can be adapted to a variety of different geometries. Furthermore, the grating modulator array 40 dimensions are different than a typical waveguide because the thickness through which the light travels can be reduced while the surface dimensions can be as large as is needed to accept all the input light. Waveguide devices also experience considerable coupling losses and require a very strict tolerance of the angle of the incident light. These restrictions need not apply to a bulk electro-optic device. The bulk reflective periodically poled electro-optic diffraction grating modulator array 40 also has advantages relative to the micromechanical modulator technologies such as the digital micro-mirror or the deformable grating modulator. Mainly, the grating modulator array 40 can be fabricated in any of a variety of nonlinear optical materials with switching speeds and power handling capabilities that far exceed the performance of the micro-mechanical modulators.

The bulk crystal 46 can consist of any of a number of different crystals that experience an electro-optic effect. Crystals such as LiNbO3, LiTaO3, and BaTiTaO$_3$ are useful because each possess a strong r51 or r33 electro-optic coefficient.

Figure 2B:
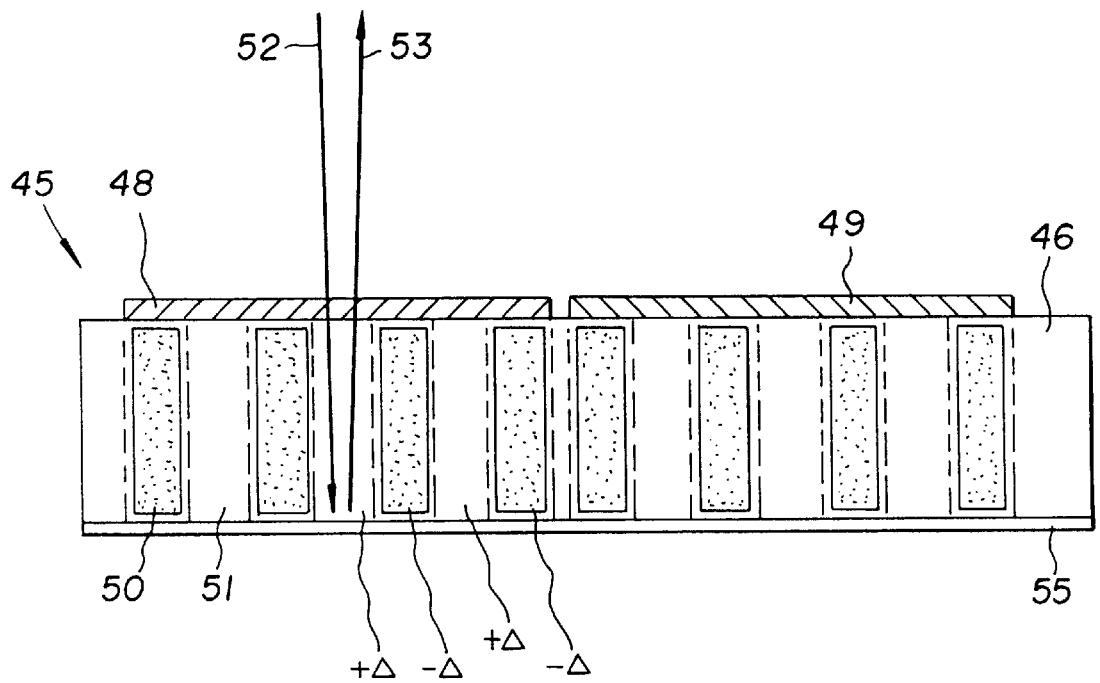

FIG. 2a depicts a bulk reflective periodically poled electro-optic diffraction grating modulator array 40 with a single row of modulator sites, in which just two adjacent modulator sites 41a,b are shown. The crystal is periodically poled along the c-axis in regions parallel to the xz plane creating alternating poled regions 50, 51 with reversed domains. Each modulator site contains a plurality of poled regions wherein it is desirable but not necessary to have at least six poled regions within each modulator site. For the bulk reflective periodically poled electro-optic diffraction grating modulator array 40 of FIG. 2a, the periodic poled regions 50, 51 of one modulator site are oriented adjacent and parallel to the periodic poled regions of the next modulator site. FIG. 2b is a cross-sectional view of the device shown in FIG. 2a. Incident light 52 is directed into the crystal at a small angle with respect to the y-axis (y-cut crystal) and is polarized along or close to the c-axis (z-axis). The incident light 52 passes through the transparent surface electrodes 48a,b as well as the region between opposite electrodes. Between the electrodes 48a,b, an electric field is applied along the z-axis of the crystal, thereby inducing an electro-optic effect. The electrodes need not be transparent if the illumination is constrained so as not to illuminate the electrodes. However, transparent electrodes enable flood illumination and ease the optical system constraints.

A given electrode, such as 48a, addresses periodically poled regions 50,51. Application of an electric field to surface electrodes 48a,b induces an electro-optic effect in the light passing through adjacent regions of the crystal 50,51. Incident light travels along the y-axis, while the polarization state is along the z-axis. If the polarization of the incident light 52 from the laser diode array 11 is not oriented to match this z-axis, the orientation can be corrected by a wave plate 29, shown in FIG. 1, inserted into the illumination system 20. Within each region of the modulator site, light polarized along the direction of the electric field, the z-axis in FIG. 2a, experiences an electro-optically induced phase distortion. However, adjacent regions experience phase changes in directions opposite one another because the alternating poled regions 50, 51 are periodically poled such that the domains are in opposite directions. For example, if light passing through regions 50 experiences a net phase change of 90°, light passing through regions 51 experiences a net phase change of −90°. The relative phase change between adjacent regions is then 180° which provides the maximum diffraction efficiency.

Within the bulk crystal 46, individual modulator sites 41a,b are determined by a grouping of adjacent poled regions 50,51. A single electrode pair 48a and 48b addresses each modulator site and an electric field is applied between the electrodes 48a, 48b. Each modulator site contains several regions and adjacent regions within a modulator site 50,51 induce a relative phase shift within an incident beam in the presence of an electric field. This grouping of regions forms a local diffraction phase grating addressed by a single electrode pair.

The reflective surface 55 returns light through the crystal to double the electro-optic effect. The exiting light 53 contains a phase disturbance, which is converted by print lens element 81 into a diffraction pattern 87 at the fourier plane 85. The diffraction pattern 87 is represented graphically in FIG. 3 as an irradiance plot versus position. In the absence of an electric field, there is no induced phase difference, as the adjacent poled regions 50,51 within a given modulator sites 41 induce identical phase effects on incident light, and the light is not diffracted. The width and structure of the spatial filter 86 is chosen to maximize light throughput to the media plane while maintaining sufficient contrast. When the spatial filter 86 is a slit as shown in phantom in FIG. 3, it will pass undiffracted unmodulated light, while rejecting diffracted modulated light.

Figure 12:
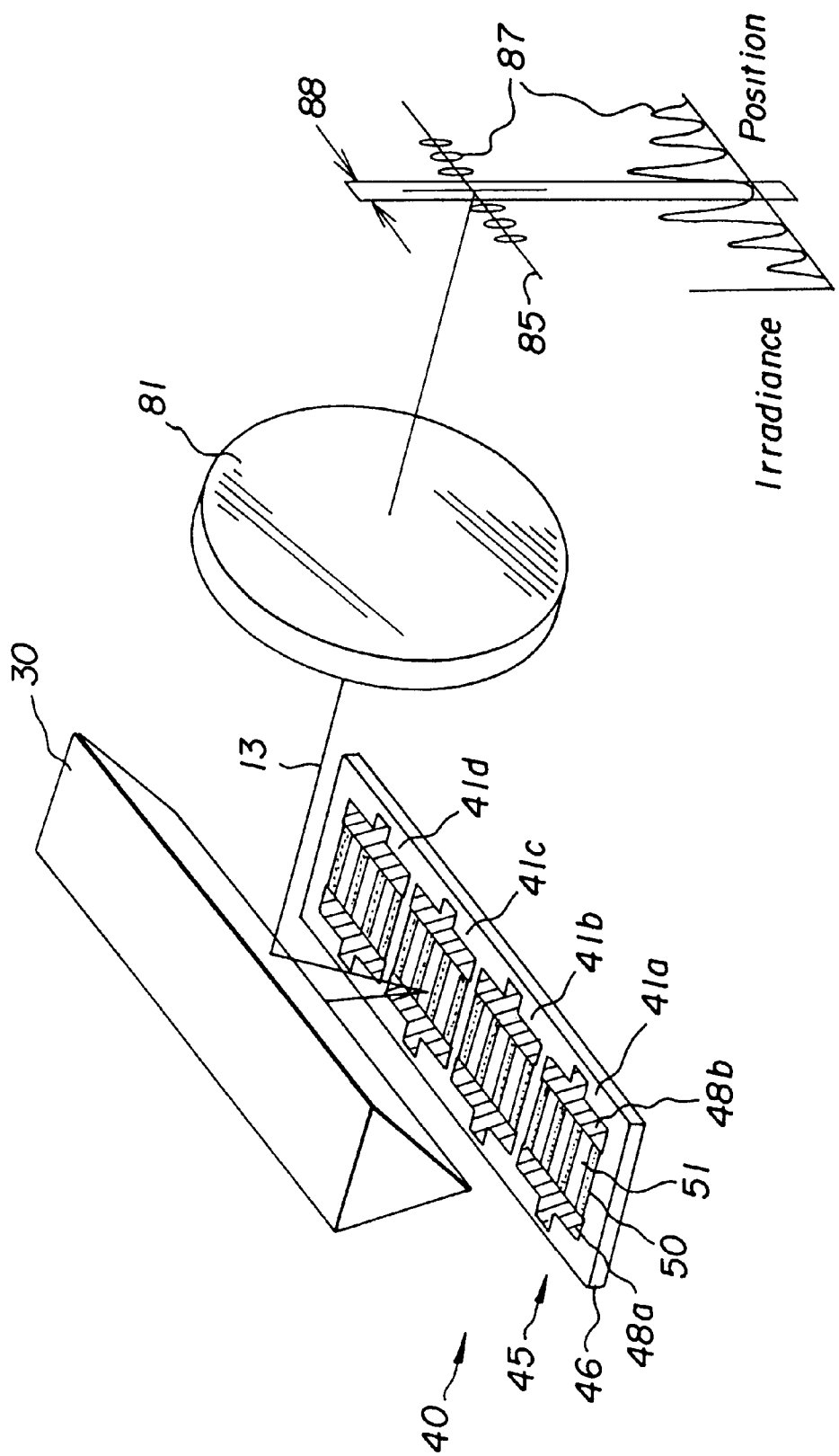
FIG. 12 is a perspective view of a grating modulator array with a grating axis of each modulator site oriented parallel to an axis of a row of modulator sites.

In an alternate embodiment, the spatial filter is a stop 88 shown in FIG. 12, which rejects the undiffracted light and passes the modulated diffracted light. Typically, while modulation contrast is improved through the use of a stop rather than a slit, the throughput light efficiency of the system is reduced. The spatial filter 86 can also be composed of a composite series of slits or stops, or gratings, or graduated structures, or even non-linear optical media designed to maximize the efficiency of the device. The design of the print lens 80 for either the stop or composite filter is more difficult, as it must pass a larger range of angles.

To form a linear spatial modulator array 40, multiple modulator sites 41 must be placed in proximity. As shown in FIG. 2a, for the bulk reflective, periodically poled, electro-optic diffraction, grating modulator array 40, two modulator sites 41a and 41b are formed along the array by placing electrodes 48a,b parallel along the x-axis to the adjacent modulator site electrodes 49a,b. In order to obtain a high optical fill factor, the modulator sites may be placed as close to the adjacent modulator site as operating voltage allows. Close placement of modulator sites may lead to electrical and optical cross-talk depending upon the pitch of the electrodes, geometry of the crystal, and the operating voltage.

Use of periodically poled regions serves to reduce crosstalk effects and render the device more suitable for printing applications because a common electrode can effect adjacent regions oppositely while providing the same electric field. Because each modulator site contains independent regions, which are either independently addressable or addressable on a per modulator site basis, light exiting the crystal contains phase distortions unique for each modulator site. Each modulator site contains an optimal number of alternating regions determined by the constraints of the system. For example, a modulator site may contain six alternating regions within a modulator site. The width of each region, and hence the total width of the modulator site is determined by the pitch achieved while poling. For a 20 $\mu$m poling period, and 6 regions within a modulator site, the modulator site width would be 120 $\mu$m. The pitch of the poling determines the diffraction angles of the outgoing light, which in turn determines the nature of diffraction pattern 87 shown at the fourier plane 85 of FIG. 3. Consequently, the pitch of the poling is determined in large part by the numerical aperture (NA) of the incident light and the spatial filtering system.

Figure 3:
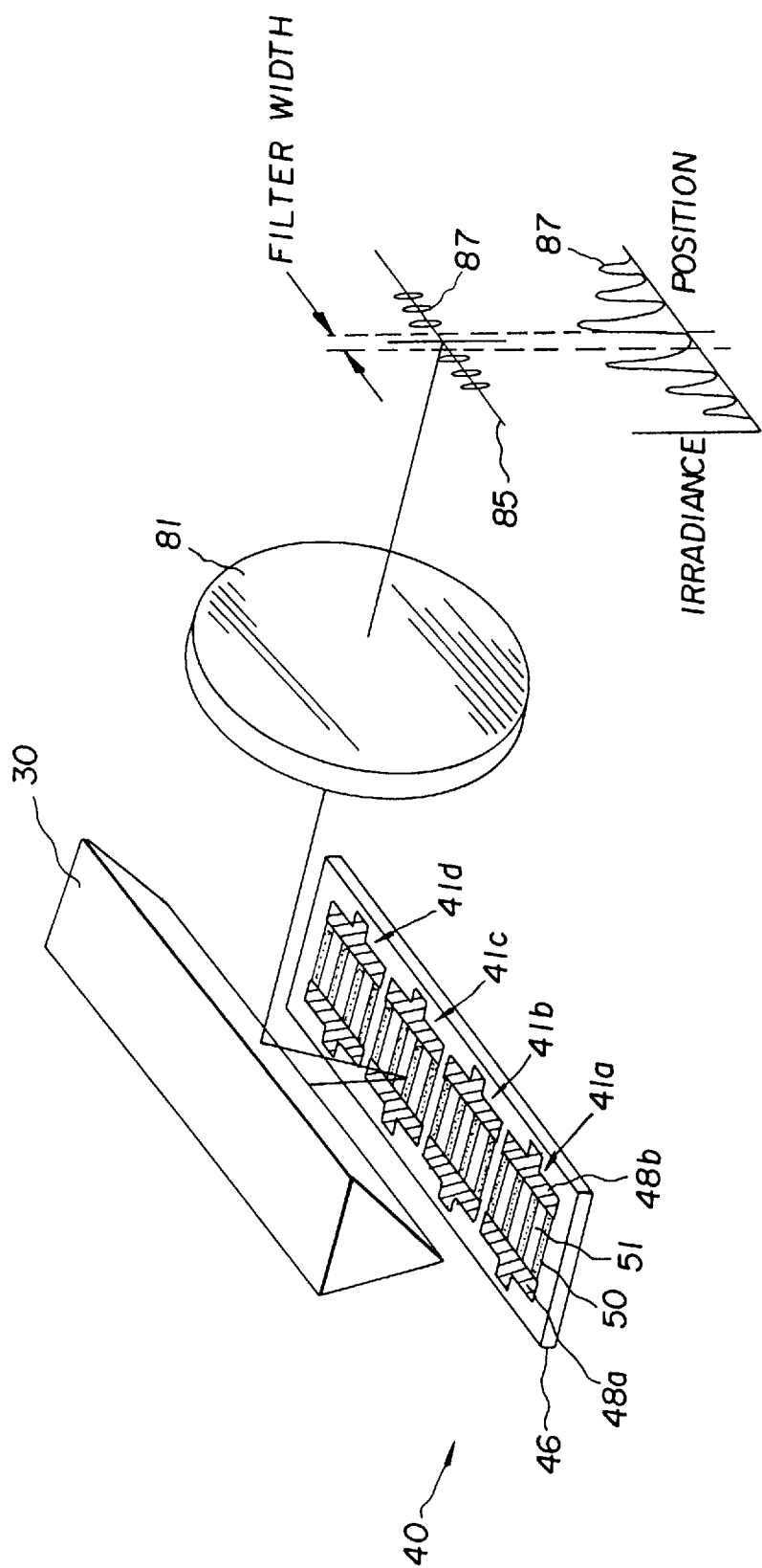
FIG. 3 is a perspective view of a grating modulator array with a grating axis of each modulator site oriented parallel to an axis of a row of modulator sites.

As shown in FIG. 3, when the grating modulator array 40 is constructed with multiple modulator sites 41a–d where the diffraction grating are perpendicular to the optical axis 13, then the diffracted light 87 spreads out in the fourier plane 85 in a direction parallel to that of the modulator array. As noted previously, the laser diode array 11 has a Lagrange in the array direction which is approximately 1000 times greater than that of the cross-array direction. This large Lagrange, which translates into a large NA at modulator 40, may degrade the performance of laser printer 10 in several significant ways. First, the undiffracted array direction light is spread over a much wider distance at the fourier plane 85 than is the undiffracted cross-array light. With a schlieren based grating modulator array 40, and particularly with a grating device which operates by diffraction in the array direction, each modulator site requires a large grating frequency to drive the diffracted light outside the width of the spatial filter 86. The need for a relatively large grating frequency limits the solution space for finding an acceptable design for a grating type grating modulator array 40. As a result, the device structure and the required processing are more demanding. Furthermore, the modulation contrast for a modulator site and the optical crosstalk between modulator sites may still be compromised.

Figure 4:
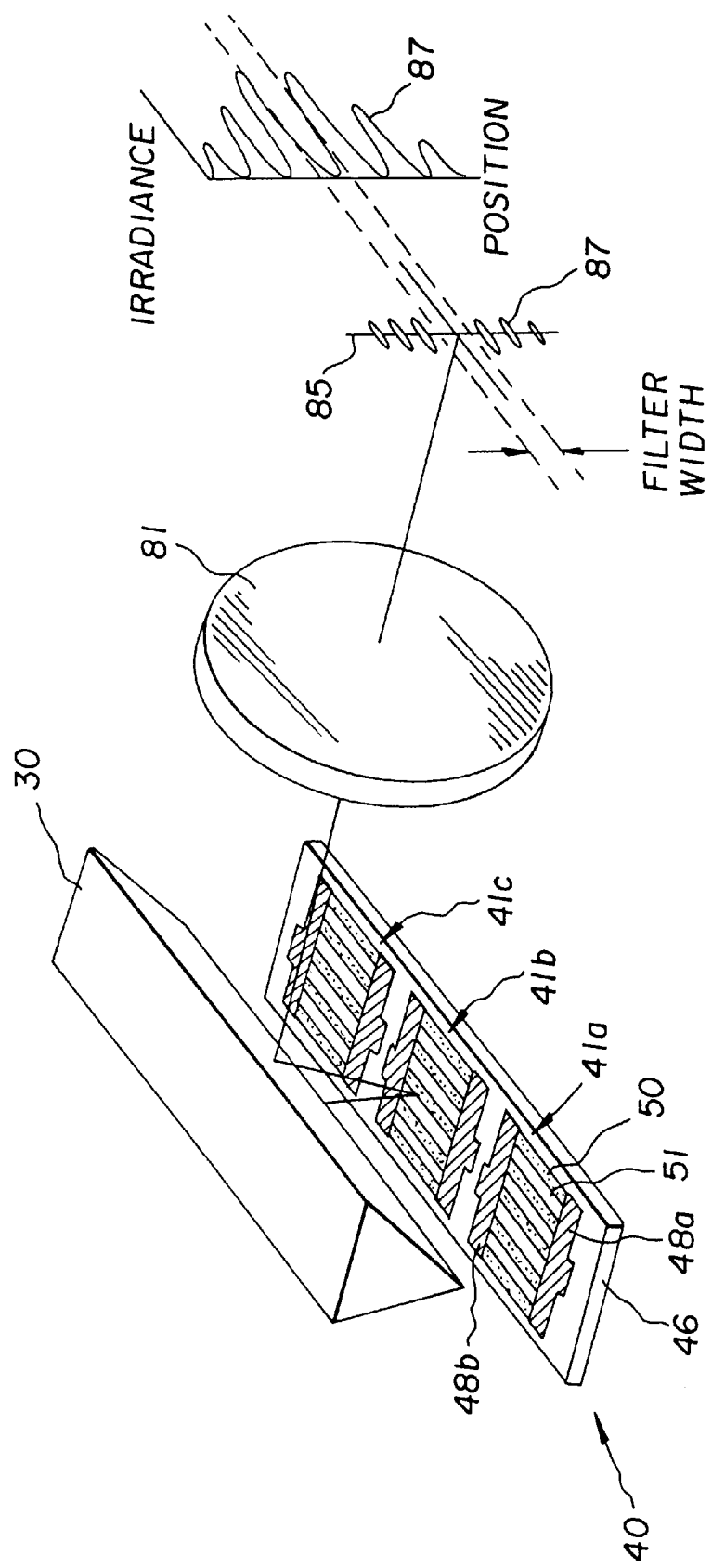
FIG. 4 is a perspective view of a grating modulator array with a grating axis of each modulator site oriented perpendicular to an axis of a row of modulator sites.

For a system in which the array Lagrange of the laser diode array 11 is 1000 times the cross array Lagrange, the performance of both the laser printer 10 and the grating modulator array 40 is improved when each modulator site 41 diffracts the light in the cross array direction. Such a configuration is shown in FIG. 4, where the modulator sites 41a–c of grating modulator 43 are arranged as diffraction gratings parallel to the optical axis 13. In this case, the diffracted light 87 spreads out in the fourier plane 85 in a direction perpendicular to that of the modulator array. Using this configuration, the modulating contrast is improved over that of the configuration shown in FIG. 3. However, as compared to the grating modulator array 40 of FIG. 3, which has a high optical fill factor, approaching 95%, the grating modulator array 40 of FIG. 4 may require the electrodes of adjacent modulator sites to be placed further apart to avoid electrical cross-talk and interference patterns. Determination of the placement of the electrodes would largely be a function of operating voltage. However, if the electrodes of adjacent modulator sites need to be displaced significantly, the optical fill factor would be reduced, causing a loss of overall system efficiency.

Figure 5:
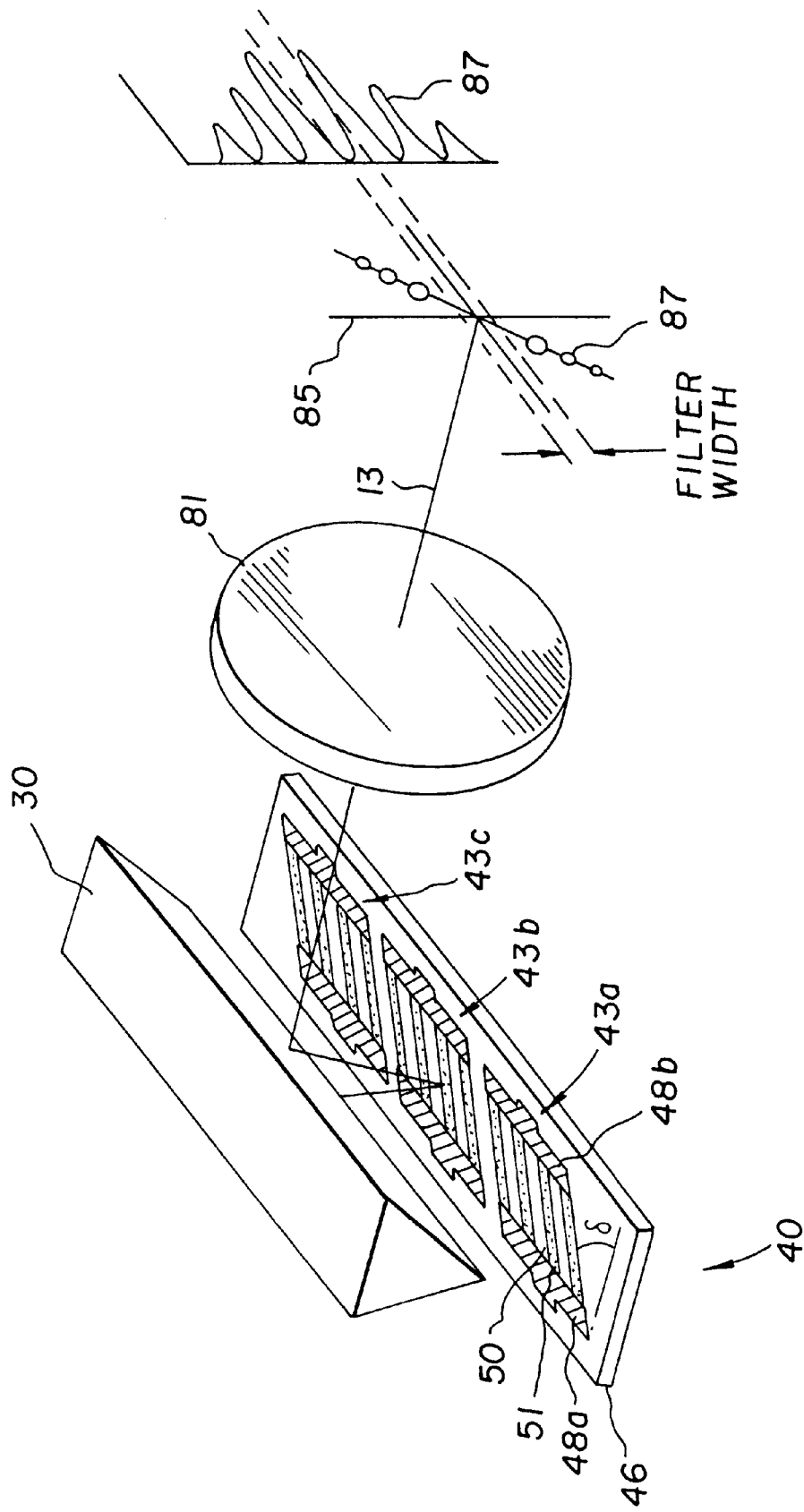
FIG. 5 is a perspective view of a grating modulator array with a grating axis of each modulator site skewed at an angle to an axis of a row of modulator sites.

In FIG. 5 an optimal modulator configuration for use in a laser thermal printer is shown. The grating modulator array 40 has the poled regions within each of the modulator sites 41 skewed at an angle $\delta$ relative to the optical axis 13. In this case, the diffracted light 87 spreads out in the fourier plane 85 at an angle skewed relative to the plane of the modulator array, and perpendicular to the projected skew angle of the modulator array. The spatial filter 86, shown in FIG. 1, can be oriented parallel to the grating modulator array 40, or at an angle conjugate to the diffracted light. This arrangement rejects diffracted light in the cross array direction, thereby improving the contrast of the modulated light. By skewing the poled regions, a high optical fill factor can be obtained.

Figure 2E:
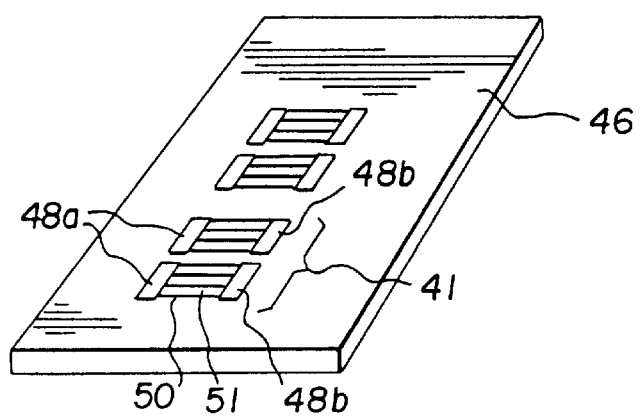
FIG. 2e is top view of a grating modulator array with multiple electrodes addressing poled ions within a modulator site.
Figure 2C:
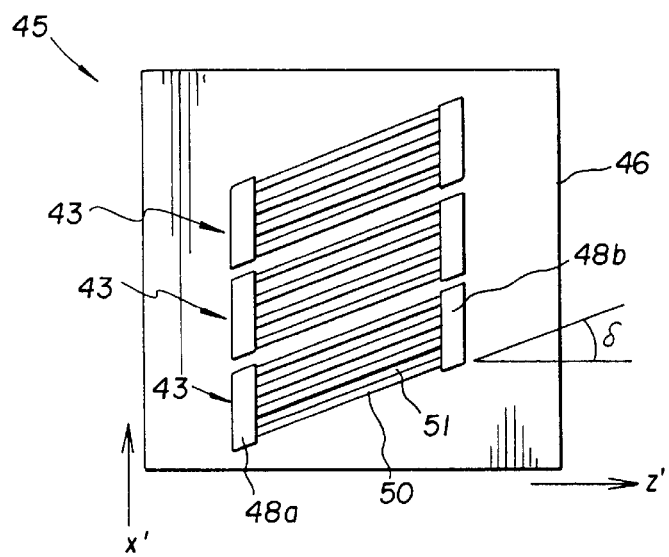
FIG. 2c is a top plan of another embodiment of a grating modulator array comprised of a single row of modulator sites with skewed, poled regions.

In FIG. 2c, the grating modulator array 40 is configured with skewed modulator arrays at some non-zero skew angle 6 with respect to the array direction, so as to function as the FIG. 5 linear spatial light modulator 40 with skewed grating modulator arrays. There are several means by which to accomplish this. First, the array may simply be rotated in the system. In order to support a sufficient number of modulator sites, the z-dimension width must be sufficiently large and the modulator sites large enough to accept the input light. Alternatively, the crystal may be cut such that the facets are at a non-zero angle with respect to the x and z-axis as is seen in FIG. 2c. The device may then be poled and patterned at an angle with respect to the axis of the illumination system. The modulator sites within a row lie parallel to the facet and the grating contained within each modulator site lies along the z-axis of the crystal. In either case, a wave plate 29 or polarizing element will likely be needed before the light enters the modulator to rotate the axis of polarization to match that of the crystal.

Figure 2D:
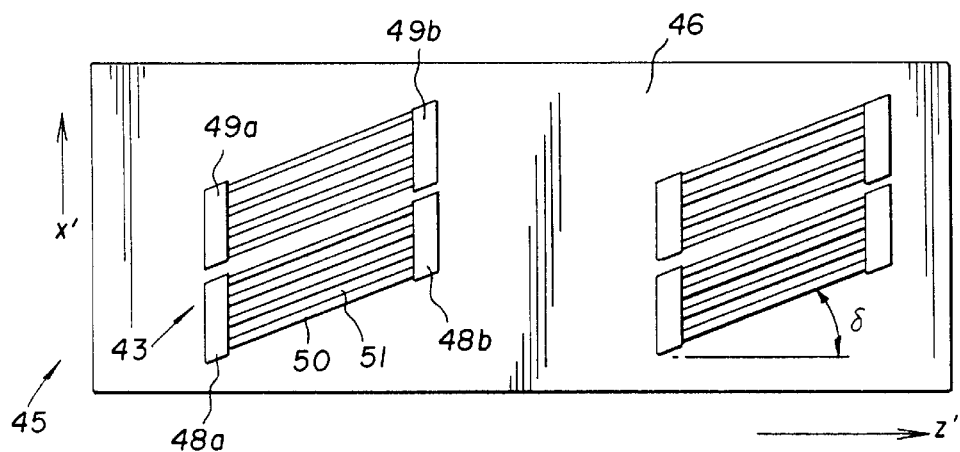
FIG. 2d is a top plan view of yet another embodiment of a grating modulator array with two row of skewed modulator sites.

It is also possible to include more than one line array per device 45 as is seen in FIG. 2d. In FIG. 2d one linear array of modulator sites is represented by two adjacent modulator sites, shown with electrode pairs 48a,b and 49a,b, which lie along the same line. A second linear array is shown as a line of modulator sites parallel to the first line. The number of modulator sites per array may vary and is primarily determined by the crystal size and the operating requirements. A printer with multiple parallel linear arrays would allow the illumination of multiple lines simultaneously, as well as TDI (Time Delayed Integration) printing, gray scale printing, and error correction in the event of modulator site failure or reduced performance. The grating structures of the modulator sites in the multiple parallel linear arrays may be skewed as shown in FIG. 2d, or not, as in FIG. 2a.

In FIGS. 2a–d, each modulator site is defined by a single electrode pair with a differential voltage applied between them and which interacts with the intervening poled regions 50, 51. It is also possible to place an electrode pair per poled region or subset of poled regions within a modulator site as is shown in FIG. 2e. While complex, such patterning may allow for image correction and extended gray scale. Furthermore, increasing the ability to address regions within a modulator site allows the user to change the periodicity and nature of the diffraction grating rendering the device capable of producing regular and unique diffraction patterns. If the regions contain individual electrode pairs it is also possible to omit the poling and use the opposite polarities of the applied electric field, or intermediate regions with no applied electric field to determine the relative changes in index. This method however, requires sufficient spacing between electrodes and may lead to electrical cross-talk and to electric field distributions that do not optimize the grating effect. Consequently, use of periodically poled regions is strongly encouraged. In all cases, a voltage induced gray scale provides many controllable, and reproducible levels. FIG. 2e is top view of a grating modulator array with multiple electrodes addressing poled regions within a modulator site.

It should be noted that there exists several basic geometries of the described embodiment. The electrode patterning may lie on the top facet, or the facet through which light initially enters. In this case, the top facet may require an anti-reflection coating, while the bottom facet would be reflective. If the device is to be used in transmission, the bottom facet may also contain an antireflection coating and would not be reflective. It is possible to use a device a transmissive device in a reflective manner by simply placing an external mirror beneath the bottom facet. This, however, may prove to be lossy.

When used in transmission, the device offers the same advantages over the prior art as it does in reflective operation. Furthermore, the optical system illuminating as well as following the modulator can be considerably simplified and the optical system efficiency increased. However, the extent of the electro-optically induced diffraction efficiency at a given operating voltage is greater for reflective operation than for transmissive operation. For this reason, operation in the reflective geometry of the device is preferred.

The patterning may also be established on the bottom facet. In this case, the top facet of the device would contain an anti-reflection coating, and the bottom facet would be reflective. The electrodes would not need to be transparent and the entire bottom layer may be reflective. It is also possible to establish reflectivity in the regions where light is incident. If the device is to be used in transmission, the top facet would require an anti-reflection coating, while the bottom facet may require transparent electrodes and an anti reflection coating. The device designed for use in transmission may also be used in reflection by placing an external mirror immediately following the device.

It is also possible to pattern both the top and bottom facets of the device. Patterning both facets would increase the extent of the electro-optic effect and thereby reduce the required voltage. However, such a device may prove cumbersome to accurately pattern and package. If both sides of the device are patterned, the top facet of the device would contain an anti-reflection coating, and the bottom facet would be reflective.

Figure 6A:
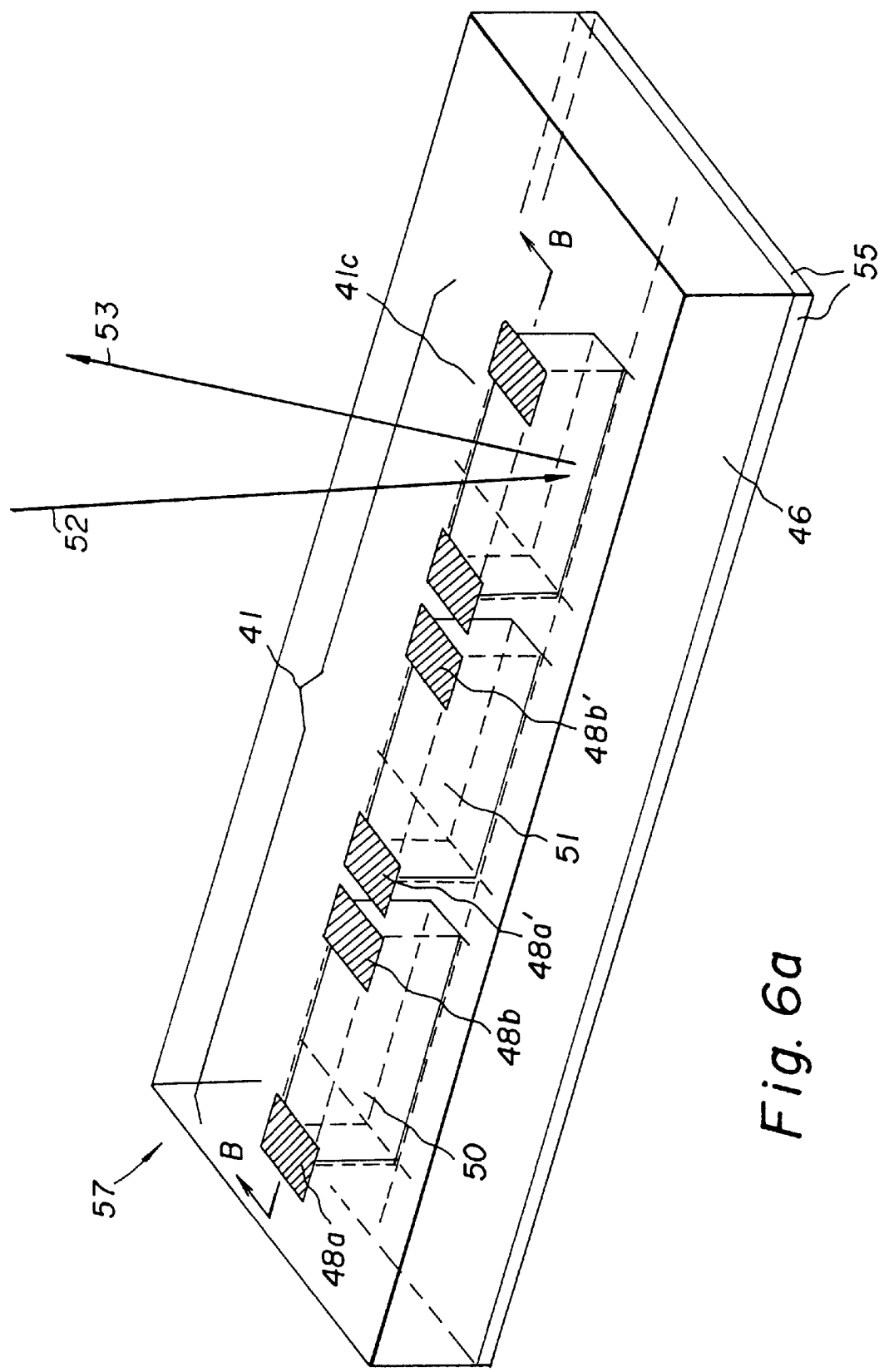
FIG. 6a is a perspective view, partially in phantom, of an alternate embodiment of a modulator site with the grating axis oriented co-linearly within the modulator site.

An alternate embodiment for the grating modulator array 40 is given in FIG. 6a and FIG. 6b. This device 57 is an alternate design for a bulk reflective periodically poled electro-optic diffraction grating modulator, wherein the linear array is formed by modulator sites where the periodic poled regions of one modulator site are adjacent, parallel to and co-linear to the poled regions of the next modulator site. The operating principle is similar to that of the previous embodiment. As with the previous embodiment, application of an electric field induces an electro-optic effect thus creating a diffraction phase grating in the x-z plane. In the absence of an electric field, the device contains no grating and the light remains undiffracted. In this embodiment 57, the individual regions within a modulator site are defined along the z-axis. As depicted in FIG. 6a, each modulator site has a transparent surface electrode pair 48a,b, 49a,b, etc., as required to address the poled regions within. Again, the transparent electrodes serve to reduce the constraints on the optical system. Non-transparent electrodes may be used, however, system efficiency may be compromised as light reflects off the electrodes. A voltage is applied between the a and b electrodes, thus defining a series of regions along the z-axis. A grouping of regions defines a single modulator site as is seen in the cross-sectional view of FIG. 6b.

Figure 6D:
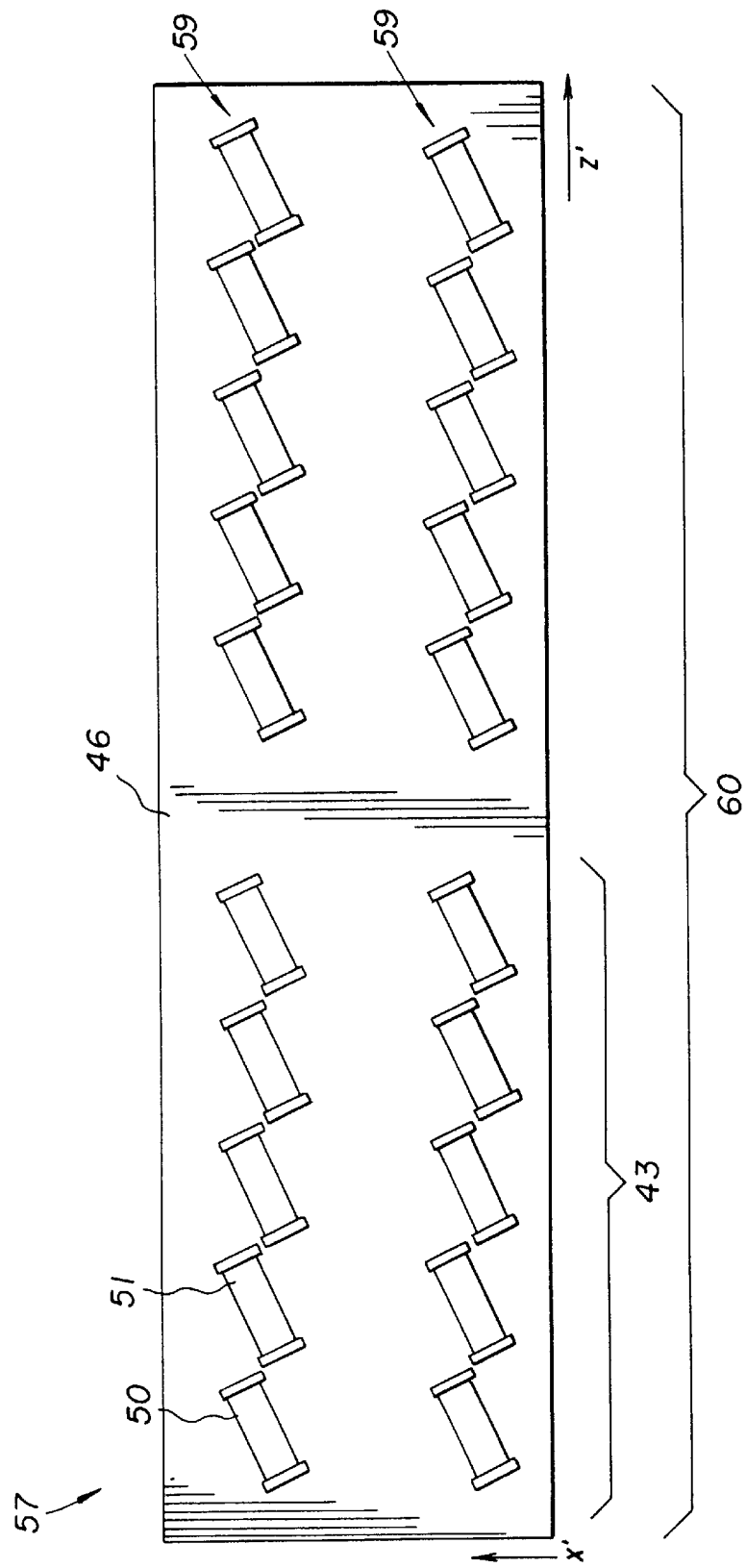
FIG. 6d is a top plan view of a modulator site with multiple rows of skewed regions.

FIG. 6c is a top plan view of yet another embodiment of modulator site with skewed regions. The optical system constraints again lend to a preference for skewed modulator sites 43 with the gratings placed at an angle δ with respect to the optical axis. Again, this can be accomplished by either simply rotating the device in place or by cutting the crystal such that the z-axis forms the required angle with respect to the facet of the device as is shown in FIGS. 6c and 6d. The gratings then follow z-axis while the illumination is parallel to the flat facet of the modulator labeled z'. It again may be useful to create a modulator with multiple parallel linear modulator arrays, as in FIG. 6d. In this event, multiple rows are patterned along the x' axis and the modulator sites within a row lie along the z' axis. The grating elements themselves lie along the z-axis. If the grating is not-skewed, the x' and x-axes are coincident as are the z' and z-axes.

As with the previous embodiment gray scale can be achieved either through time-delayed printing, through voltage induced gray scale or through pulse-width modulation. The modulator can also be operated in reflection or transmission. This device need not be poled to operate. In such a configuration, adjacent regions may share a common electrode. For instance electrode 48b may be concurrent with electrode 49a. However, poling the device increases the efficiency and reduces the detail required on the final patterning of the device as a single electrode pair can be used to activate multiple regions. Inclusion of this device into the optical system for laser printer 10 is as in the first embodiment.

It should be noted that the same basic package and patterning geometries described in the previous embodiment are applicable to this embodiment.

This embodiment may allow modulator sites to be smaller and more closely placed along the cross-scan axis then the previous embodiment. However, patterning this device is more detailed and may prove more difficult than the previous embodiment.

Figure 7A:
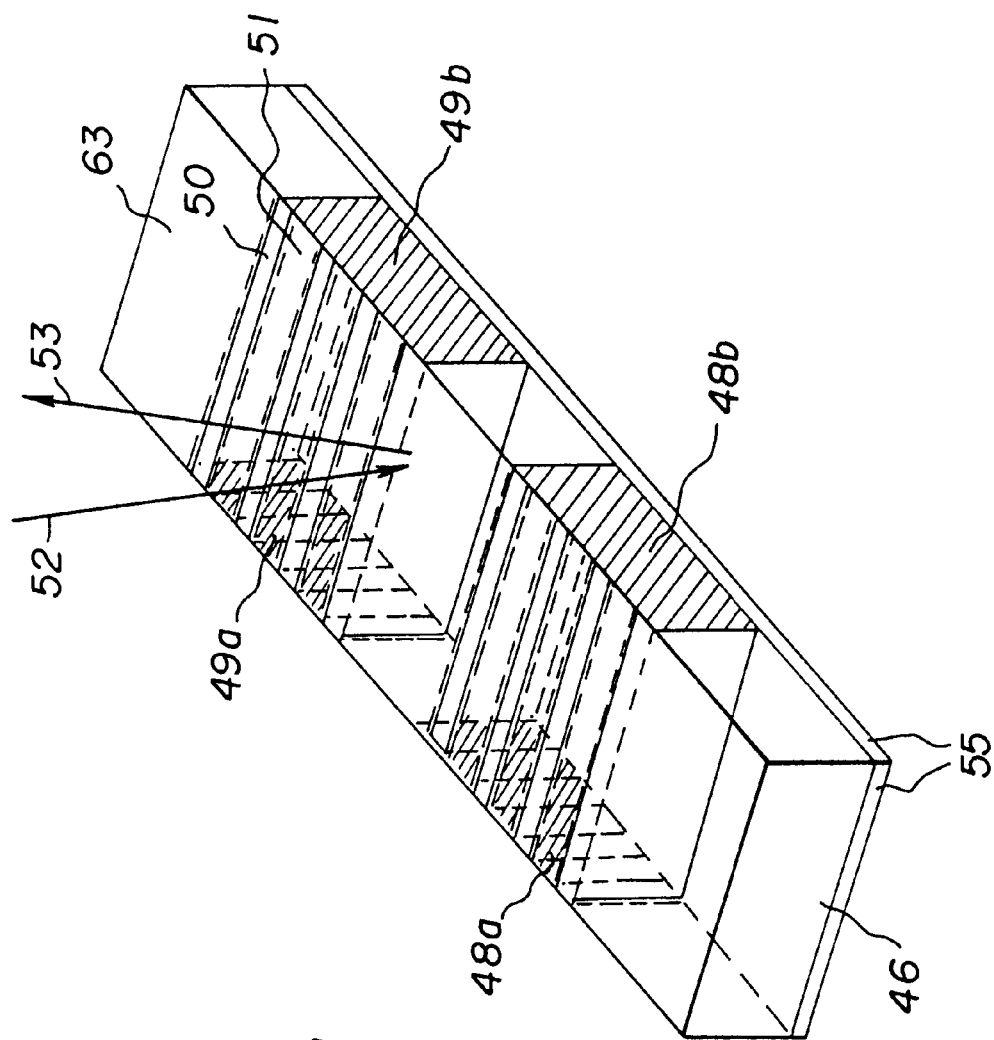
FIG. 7a is a perspective view, partially in phantom, of an alternate embodiment of a grating modulator array with modulator sites with periodic poled regions oriented adjacent and parallel to the poled regions of the next adjacent modulator site, and electrodes on the sides of the modulator site.
Figure 7B:
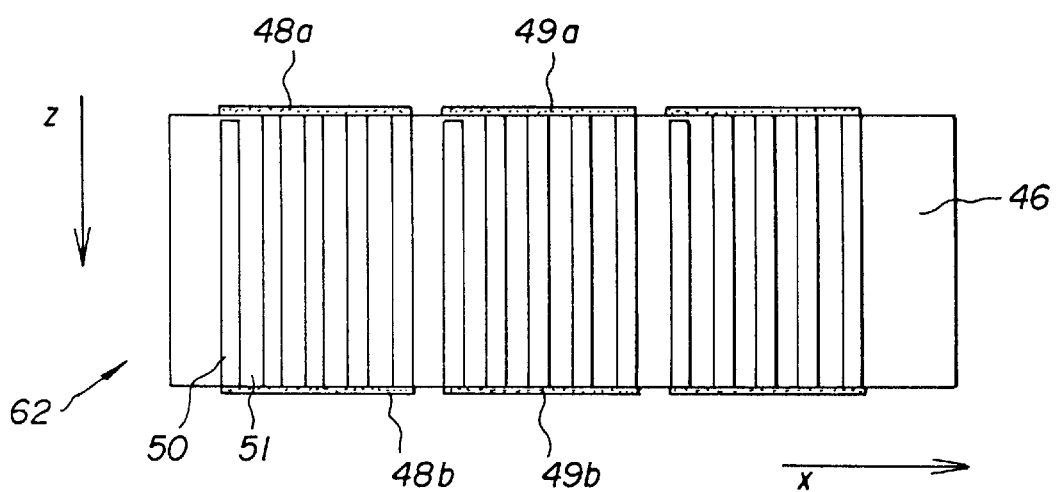

An alternate embodiment for the grating modulator array 40 is given in FIG. 7a. This device, 62, is an alternate design for a bulk reflective periodically poled electro-optic diffraction grating modulator, wherein the linear array is formed by modulator sites where the periodic poled regions of one modulator site are oriented parallel and adjacent to the periodic poled regions of the next modulator site, while the electrodes are patterned on the side of the bulk crystal 46. In this embodiment, as the electrodes of a modulator site, such as 48a and 48b are on opposite side faces of the crystal, they need not be transparent or under-illuminated as in the earlier embodiments. One facet may serve as a ground plane, with light 52 passing through the top face of the crystal 67. In this case, the crystal may be poled along z-axis, while light propagating along the y-axis is polarized along the z-axis. The modulator sites lie along the x-axis as do the individual regions 50, 51 as is shown in the cross-sectional view of FIG. 7b. Light passes through the modulator along the y-axis, reflects off the bottom surface 55 and returns through the bulk material 46. Each modulator site contains a number of poled regions with electrodes on the x-z planes of the crystal. As with the previous embodiment, application of an electric field induces an electro-optic effect thus creating a diffraction phase grating in the x-z plane. In the absence of an electric field, the device contains no grating and the light remains undiffracted.

The advantage of this device is that the lack of transparent electrodes increases the optical efficiency of the system while retaining the ability to diffract light out of the plane. Also, as the electrode pairs, such as 48*a,b*, are on opposite sides of the bulk crystal 46 and may be elongated with respect to the depth of the crystal, thus providing an electric field that extends further into the crystal. The longer electrodes would reduce the required applied voltage. However, this embodiment would require polishing 4 out of the six facets of the crystal.

Skewing the modulator sites is again accomplished by either placing the modulator at angle within the optical system, or by cutting the crystal such that the poling axis occurs at angle with respect to the facets of the crystal and with respect to the optical axis 13 of the system.

As with the previous embodiments, gray scale can be achieved either through time-delayed printing, through voltage induced gray scale, or through pulse-width modulation. The modulator can be operated in reflection or transmission as in the previous embodiments. While this device need not be poled to operate, poling the device increases the efficiency and reduces the detail required on the final patterning of the device as a single electrode pair can be used to activate multiple regions. Inclusion of this device into the optical system for laser printer 10 is as in the first embodiment.

Yet another alternate embodiment for the grating modulator array 40 is shown in FIG. 8*a*. In this embodiment, the top surface 67 of a z-cut crystal is patterned with transparent electrodes and the bottom electrode 69 acts not only as a reflector, but as a ground plane as is seen in FIG. 8*a* and FIG. 8*b*. Light 52 passes through the transparent electrodes 68 (ITO), through the bulk electro-optic crystal 46, reflects off the reflective electrode 69, returns through the bulk material and exits out the transparent electrode 68. This embodiment offers the advantage that it is not periodically poled, thus reducing the required processing.

The top facet 67 of this modulator 66 contains a series of electrodes 68 each defining a region. A group of electrodes forms a modulator site. The electric field is applied along the z-direction between an electrode and the reflective ground plane 69, and light propagates along the z-direction. The incident light 52 should be polarized along the y-direction. For certain crystals such as $BaTiTaO_3$ the r51 electro-optic coefficient is strong enough, that a diminished effect along y-axis is sufficient to cause a perturbation to the refractive index that can distort the phase of incident light. By patterning the electrodes in a regular manner and addressing adjacent groups of electrodes simultaneously, a phase grating is created and a regular diffraction pattern is produced.

Figure 8C:
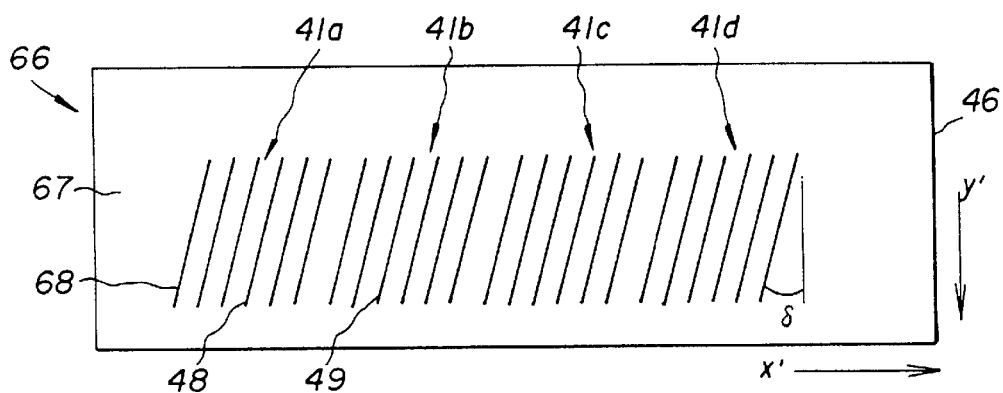
FIG. 8c is a top plan view of an alternate embodiment of a grating modulator array with skewed modulator sites in a single row.
Figure 8D:
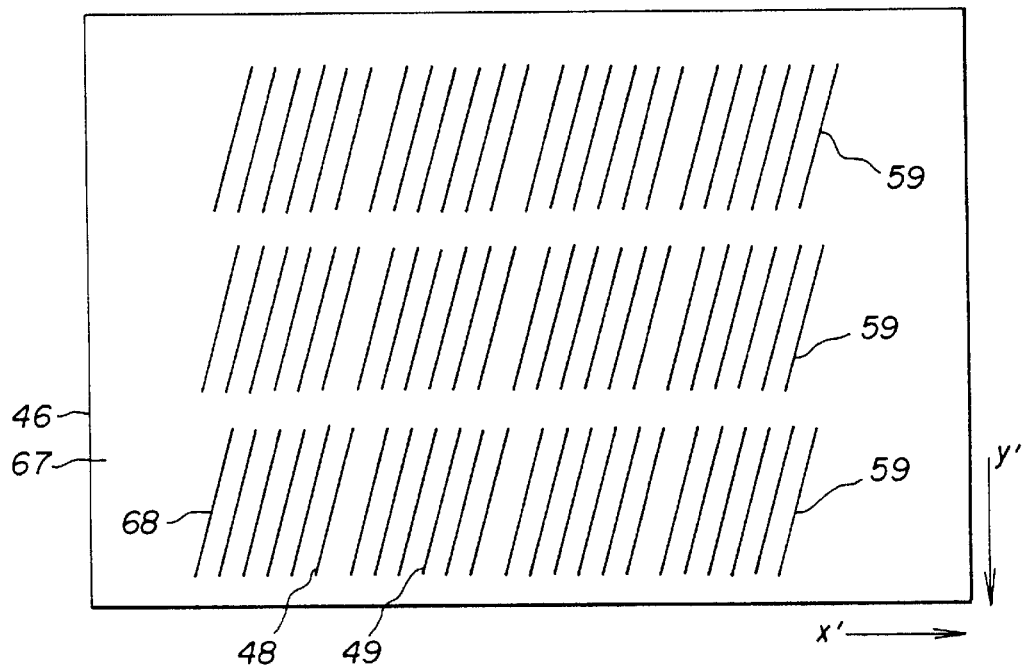
FIG. 8d is a plan view of an alternate embodiment of a grating modulator array with multiple modulator sites.

This device can be skewed or cut at an angle with respect to the crystal axis to support skewed modulator sites as is shown in FIG. 8*c*. The pattern lies at a non-zero angle 5 with respect to the side facets of the crystal. The modulator sites lie along the x' axis. Furthermore, inclusion of multiple rows of multiple modulator sites is straightforward as is shown in FIG. 8*d*, wherein multiple rows can lie along the y' axis.

As with the previous embodiments, this device can also be used in transmission, but would require the electrode on the bottom surface be transmissive. The gray scale may be voltage induced. Furthermore, the bottom facet may be patterned instead of serving as a ground plane. This would reduce electrical cross-talk but would increase the difficulties of packaging. Inclusion of this device into the optical system for laser printer 10 is as in the first embodiment.

Figure 9:
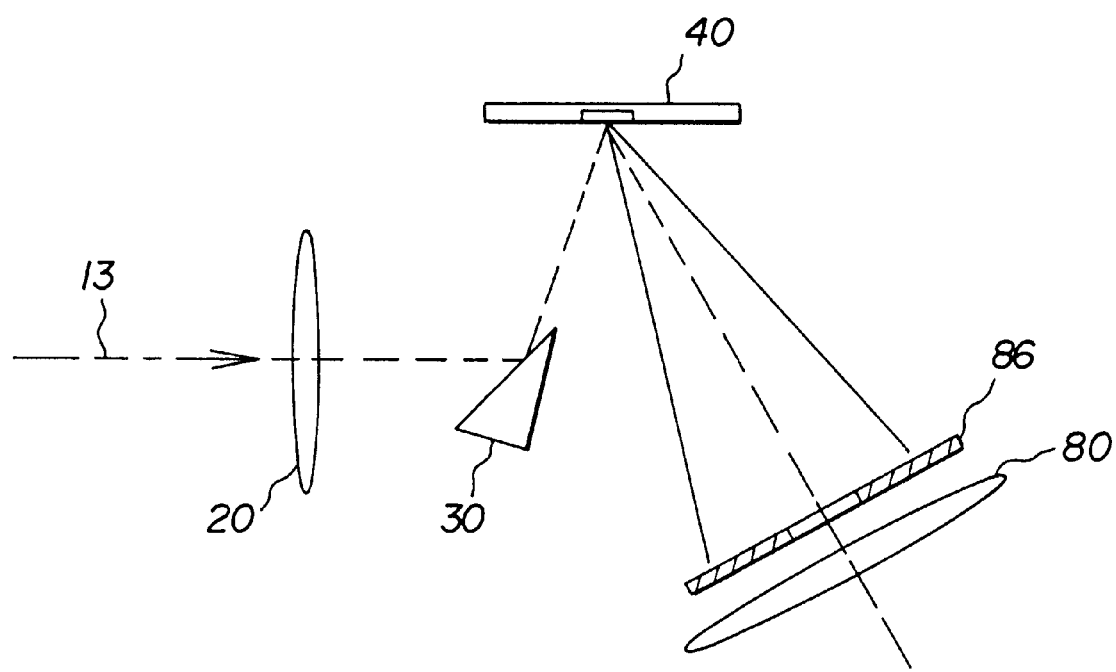
FIG. 9 is a side view of an alternate method of directing light to a grating modulator array.
Figure 11:
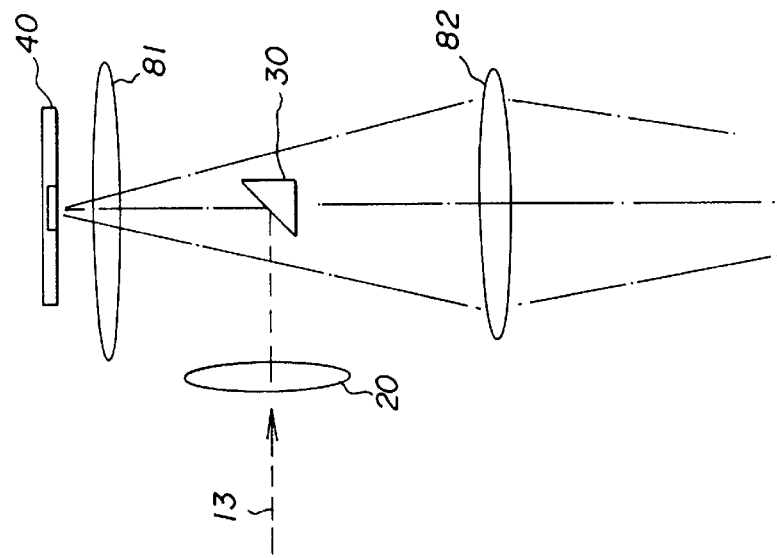
FIG. 11 is a side view of yet another method of directing light to a grating modulator array.
Figure 10:
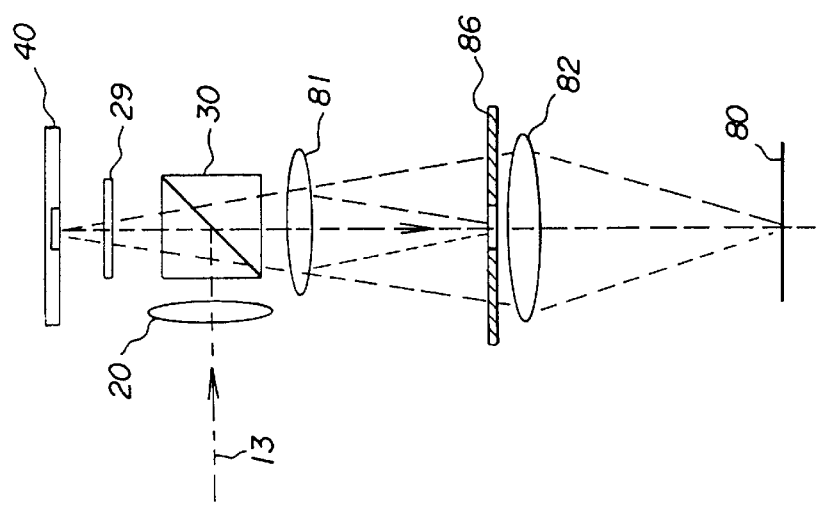
FIG. 10 is a side view of another method of directing light to a grating modulator array.

In FIG. 9, an alternate geometry is shown, where the deflector 30 is offset within the optical system, such that the light exiting the modulator does not again hit the deflector. In this case the deflector 30 is shown as an externally reflecting prism, although other designs, such as right angle prisms, in which total internal reflection occurs, could be utilized. In FIG. 10, another alternate geometry is shown for the deflector 30, in which it is transformed into a polarization discriminating beamsplitting prism. Wave plate 29 is a quarter wave plate, so that the polarization states of the incoming and outgoing light are rotated a half wave relative to each other, and the beamsplitting prism deflector 30 can separate the two beams. As the several embodiments of the grating modulator array 40 which are described earlier are polarization sensitive, care must be taken to orient the polarization to meet the requirements of the modulator, rather than just those of the prism. This may complicate the design of the beamsplitting prism deflector 30. Finally, in FIG. 11, yet another alternate geometry is shown, where a simple prism deflector 30 is used. In this case however, the deflector 30 not only functions to bring the incident light to the modulator, but it also acts as the stop structure, to provide the spatial filtering. In this configuration the deflector 30 can be the simple prism shown, or a more complex structure, such as an array of prism deflectors arranged in a picket fence structure. In that case, the incident light 52 could be structured with the appropriate gaps in angular space to optimally utilize this complex structure, or considerable light may be lost. The array of prism deflectors can also be oriented carefully to minimize the angular gaps for the incoming light, but the spatial filtering requirements for the outgoing reflected beam is that much more demanding.

The invention has been described in detail with particular reference to certain preferred embodiments thereof, but it will be understood that variations and modifications can be effected within the scope of the invention as described above, and as described in the appended claims, by a person of ordinary skill in the art without departing from the scope of the invention.

PARTS LIST

10 laser printer
11 laser diode array
12 laser diode emitters
13 optical axis
20 illumination optics
21 cylindrical micro-lens
22 cross array lens
25 laser lenslet array
26 combiner field lens
27 fly's eye integrator uniformizer assembly
28 field lens
29 wave plate
30 deflector
40 grating modulator array
41 modulator site
41*a* modulator site
41*b* modulator site
41*c* modulator site
41*d* modulator site
43 skewed modulator sites
46 bulk electro-optic crystal 48a first electrode
48b second electrode
49a first electrode
49b second electrode
50 first poled region
51 second poled regions
52 incident light
53 reflected light
55 reflective surface
57 alternate embodiment of the electro-optic modulator
59 multiple rows of modulator sites
60 modulator sites within a row
62 alternate embodiment of the electro-optic modulator
63 top face of crystal without patterning
66 alternate embodiment of the electro-optic modulator
67 top face of patterned crystal
68 transparent electrode
69 (reflective) electrode
80 print lens
81 print lens element
82 print lens element
85 fourier plane
86 spatial filter
87 diffraction pattern
88 filter stop
90 media plane

What is claimed is:

1. A grating modulator array for providing modulated phase fronts to incident light thereon comprising:
an electro-optic material;
a plurality of modulator sites comprising:
a plurality of adjacent, periodically poled regions within said electro-optic material;
a plurality of pairs of electrodes on a first surface of said electro-optic material wherein each of said pairs of electrodes addresses at least one periodically poled region; and
wherein a second surface of said electro-optic material is reflective such that said incident light is reflected back through said electro-optic material and said periodically poled regions.

2. A grating modulator array as in claim 1 wherein each of said regions within a modulator site is parallel to adjacent regions.

3. A grating modulator array as in claim 1 wherein each of said regions within a modulator site is co-linear to adjacent regions.

4. A grating modulator array as in claim 3 wherein said modulator sites are arranged in at least two rows.

5. A grating modulator array as in claim 1 wherein each of said plurality of pairs of electrodes address at least two adjacent periodically poled regions.

6. A grating modulator array as in claim 1 wherein each of said periodically poled regions is on a first axis, and each of said modulator sites is on a second axis wherein said second axis is at a predetermined angle relative to said first axis.

7. A grating modulator array as in claim 1 wherein said incident light is non-normal to said first surface of said electro-optic material.

8. A grating modulator array as in claim 1 wherein at least two pairs of electrodes address periodically poled regions within each of said modulator sites.

9. A grating modulator array as in claim 1 wherein at least one of said pairs of electrodes addresses at least one of said periodically poled region within at least one of said modulator site.

10. A grating modulator array as in claim 1 wherein said at least two electrode pairs share a common ground.

11. A grating modulator array as in claim 1 wherein said at least two electrode pairs are addressed with opposing polarities.

12. A grating modulator array as in claim 1 wherein at least one of each of said electrode pairs is transparent.

13. A grating modulator array in claim 1 wherein said first surface contains an anti-reflection coating.

14. A grating modulator array as in claim 1 wherein a first voltage is applied to a first pair of electrodes and a second voltage is applied to a second pair of electrodes.

15. A grating modulator array as in claim 1 wherein electro-optic material is selected from a group comprised of lithium niobate, lithium tantalate, and barium titanate.

16. A grating modulator array as in claim 1 wherein said regions are skewed with respect to an axis formed by a row of said modulator sites.

17. A grating modulator array for providing modulated phase fronts to incident light thereon comprising:
an electro-optic material;
a plurality of modulator sites comprising:
a plurality of adjacent, periodically poled regions within said electro-optic material;
a plurality of pairs of electrodes on a first surface of said electro-optic material wherein each of said pairs of electrodes addresses at least one periodically poled region; and
wherein a second surface of said electro-optic material is transparent.

18. A grating modulator array for providing modulated phase fronts to incident light thereon comprising:
an electro-optic material;
a plurality of modulator sites comprising:
a plurality of adjacent, periodically poled regions within said electro-optic material;
a plurality of pairs of electrodes on a first surface of said electro-optic material wherein each of said pairs of electrodes addresses at least one periodically poled region; and
wherein at least one of said pairs of electrodes is addressed with pulse width modulation.

19. A grating modulator array for providing modulated phase fronts to incident light thereon comprising:
an electro-optic material;
a plurality of modulator sites comprising:
a plurality of adjacent, periodically poled regions within said electro-optic material;
a plurality of pairs of electrodes on a first surface of said electro-optic material wherein each of said pairs of electrodes addresses at least one periodically poled region; and
wherein incident light polarized along a direction of an applied electric field undergoes a phase change when a voltage differential is applied between said pairs of electrodes as it passes through said regions and wherein a spatial filter discriminates at a fourier transform plane which makes said phase modulated light visible as spatial intensity variations.

20. A grating modulator array as in claim 19 wherein said spatial filter comprises a non-linear material.

21. A grating modulator array for providing modulated phase fronts to incident light comprising:
an electro-optic material;
a first modulator site comprising:

a plurality of periodically poled regions with said electro-optic material;

a first pair of electrodes on opposite side surfaces of said electro-optic material which addresses at least two of said poled regions;

wherein polarized light passing through said poled regions is phase shifted by a voltage differential between said pair of electrodes; and wherein a bottom surface of said electro-optic material is coated with a reflective layer and said polarized light passing through said electro-optic material is reflected back through said electro-optic material.

22. A grating modulator array as in claim 21 wherein periodically poled regions in said first modulator site are parallel to poled regions in a second modulator site.

23. A grating modulator array as in claim 21 wherein said periodically poled regions in said first modulator site are poled along a first axis and poled regions in a second modulator site are parallel to said first axis, and wherein said first and said second modulator sites form a row along a second axis, and said second axis is at a predetermined angle relative to the first axis.

24. A grating modulator array as in claim 21 wherein said polarized light is incident on a top surface of said electro-optic material and is non-normal to a plane formed by said top surface.

25. A grating modulator array as in claim 21 wherein a second pair of electrodes on an opposing side surface of said electro-optic material address at least two of said periodically poled regions within said modulator site.

26. A grating modulator array as in claim 21 wherein said electro-optic material is selected from a group comprised of lithium niobate, lithium tantalate, and barium titanate.

27. A grating modulator array as in claim 21 wherein a top surface of said electro-optic material contains an antireflection coating.

28. A grating modulator array for providing modulated phase fronts to incident light comprising:

an electro-optic material;

a first modulator site comprising:
a plurality of periodically poled regions within said electro-optic material;

a first pair of electrodes on opposite side surfaces of said electro-optic material which addresses at least two of said poled regions;

wherein polarized light passing through said poled regions is phase shifted by a voltage differential between said pair of electrodes; and wherein a bottom surface of said electro-optic material is transparent and polarized light is transmitted through said electro-optic material and said poled regions.

29. A grating modulator array for providing modulated phase fronts to incident light comprising:

an electro-optic material;

a first modulator site comprising:
a plurality of periodically poled regions within said electro-optic material;

a first pair of electrodes on opposite side surfaces of said electro-optic material which addresses at least two of said poled regions;

wherein polarized light passing through said poled regions is phase shifted by a voltage differential between said pair of electrodes; and wherein a spatial filter creates a fourier transform plane which makes said phase shifted light visible as spatial intensity variations.

30. A grating modulator array as in claim 29 wherein a bottom surface of said electro-optic material is covered by an anti-reflection coating.

31. A grating modulator array for providing modulated phase fronts to incident light comprising:

an electro-optic material;

a first modulator site comprising:
a plurality of periodically poled regions within said electro-optic material;

a first pair of electrodes on opposite side surfaces of said electro-optic material which addresses at least two of said poled regions;

wherein polarized light passing through said poled regions is phase shifted by a voltage differential between said pair of electrodes; and wherein said voltage differential is a pulse width modulated signal.

32. A grating modulator array for providing modulated phase fronts to incident light comprising:

an electro-optic material;

a plurality of modulator sites comprising:
a plurality of adjacent regions within said electro-optic material;

a plurality of pairs of electrodes on a first surface of said electro-optic material wherein each of said pairs of electrodes addresses at least one of said adjacent regions in each of said modulator sites;

wherein a voltage change in at least one of said pairs of electrodes induces a phase change in polarized light incident on modulator site associated with said at least one pair of electrodes; and wherein a second surface of said electro-optic material is reflective such that said incident light is reflected back through said electro-optic material and said regions to said first surface.

33. A grating modulator array as in claim 32 wherein each of said pairs of electrodes addresses a series of adjacent regions, wherein each of said regions in each of said modulator sites is oriented adjacent and parallel to regions of an adjacent modulator site.

34. A grating modulator array as in claim 32 wherein each of said regions within a modulator site is parallel to adjacent regions.

35. A grating modulator array as in claim 32 wherein each of said regions within a modulator site is co-linear to adjacent regions.

36. A grating modulator array as in claim 32 wherein said regions are on a first axis and said electro-optic material is cut along a second axis at a predetermined angle to said first axis.

37. A grating modulator array as in claim 32 wherein said plurality of modulator sites forms a row.

38. A grating modulator array as in claim 32 wherein said plurality of modulator sites is arranged in at least two parallel rows.

39. A grating modulator array as in claim 32 wherein said adjacent regions are poled along a first axis and said plurality of modulator sites form a row along a second axis, wherein said second axis is at a predetermined angle to said first axis.

40. A grating modulator array as in claim 32 wherein said incident light is non-normal to said first surface of said electro-optic material.

41. A grating modulator array as in claim 32 wherein at least two electrode pairs address adjacent regions within said modulator site.

42. A grating modulator array as in claim 32 wherein one pair of electrodes address all regions in a modulator site.

43. A grating modulator array as in claim 32 wherein said first surface is covered with an anti-reflection coating.

44. A grating modulator array as in claim 32 wherein said electro-optic material selected from a group comprised of lithium niobate, lithium tantalate, and barium titanate.

45. A grating modulator array for providing modulated phase fronts to incident light comprising:
an electro-optic material;
a plurality of modulator sites comprising:
a plurality of adjacent regions within said electro-optic material;
a plurality of pairs of electrodes on a first surface of said electro-optic material wherein each of said pairs of electrodes addresses at least one of said adjacent regions in each of said modulator sites;
wherein a voltage change in at least one of said pairs of electrodes induces a phase change in polarized light incident on modulator site associated with said at least one pair of electrodes; and
wherein a second surface of said electro-optic material is transparent.

46. A grating modulator array for providing modulated phase fronts to incident light comprising:
an electro-optic material;
a plurality of modulator sites comprising:
a plurality of adjacent regions within said electro-optic material;
a plurality of pairs of electrodes on a first surface of said electro-optic material wherein each of said pairs of electrodes addresses at least one of said adjacent regions in each of said modulator sites;
wherein a voltage change in at least one of said pairs of electrodes induces a phase change in polarized light incident on modulator site associated with said at least one pair of electrodes; and
wherein each of said electrode pairs is transparent.

47. A grating modulator array for providing modulated phase fronts to incident light comprising:
an electro-optic material;
a plurality of modulator sites comprising:
a plurality of adjacent regions within said electro-optic material;
a plurality of pairs of electrodes on a first surface of said electro-optic material wherein each of said pairs of electrodes addresses at least one of said adjacent regions in each of said modulator sites;
wherein a voltage change in at least one of said pairs of electrodes induces a phase change in polarized light incident on modulator site associated with said at least one pair of electrodes; and
wherein a pulse width modulated voltage is applied to each of said electrode pairs.

48. A grating modulator array for providing modulated phase fronts to incident light comprising:
an electro-optic material;
a plurality of modulator sites comprising:
a plurality of adjacent regions within said electro-optic material;
a plurality of pairs of electrodes on a first surface of said electro-optic material wherein each of said pairs of electrodes addresses at least one of said adjacent regions in each of said modulator sites;
wherein a voltage change in at least one of said pairs of electrodes induces a phase change in polarized light incident on modulator site associated with said at least one pair of electrodes; and
wherein a spatial filter creates a fourier transform plane which translates said phase change into spatial intensity variations.

49. A grating modulator array as in claim 48 wherein said spatial filter is a non-linear material.

50. A grating modulator array for providing modulated phase fronts to incident light thereon comprising:
an electro-optic material;
a plurality of modulator sites comprising:
a plurality of adjacent regions within said electro-optic material defined by application of an electric field;
a plurality of pairs of electrodes on opposite surfaces of said electro-optic material wherein each pair of electrodes addresses at least one of said adjacent regions;
wherein incident polarized light passing through a first surface and said regions undergoes a phase change; and
wherein said phase change results in a change in an angular spectrum of the outgoing light.

51. A grating modulator array as in claim 50 wherein regions in each of said modulator site are oriented parallel to regions in an adjacent modulator site.

52. A grating modulator array as in claim 50 wherein at least two electrode pairs are contained in each modulator site.

53. A grating modulator array as in claim 50 wherein at least two electrode pairs are each addressed by a different voltage.

54. A grating modulator array as in claim 50 wherein each of said regions in each of said modulator sites is parallel to regions of an adjacent modulator site, and wherein each of said regions lies along a first axis, and said modulator sites lie along a second axis, and said second axis is at a predetermined angle relative to said first axis.

55. A grating modulator array as in claim 50 wherein said regions are on a first axis and said electro-optic material is cut along a second axis, wherein said second axis is at an angle relative to said first axis.

56. A grating modulator array as in claim 50 wherein said first surface is covered by an anti-reflection coating.

57. A grating modulator array as in claim 50 wherein said electro-optic material is selected from a group comprised of lithium niobate, lithium tantalate, and barium titanate.

58. A grating modulator array for providing modulated phase fronts to incident light thereon comprising:
an electro-optic material;
a plurality of modulator sites comprising:
a plurality of adjacent regions within said electro-optic material defined by application of an electric field;
a plurality of pairs of electrodes on opposite surfaces of said electro-optic material wherein each pair of electrodes addresses at least one of said adjacent regions;
wherein incident polarized light passing through a first surface and said regions undergoes a phase change; and
wherein a second surface of said electro-optic material is reflective such that incident light is reflected back through said electro-optic material and said regions.

59. A grating modulator array as in claim 58 wherein said incident light is non-normal to said first surface of said electro-optic material.

60. A grating modulator array for providing modulated phase fronts to incident light thereon comprising:
an electro-optic material;
a plurality of modulator sites comprising:

a plurality of adjacent regions within said electro-optic material defined by application of an electric field;

a plurality of pairs of electrodes on opposite surfaces of said electro-optic material wherein each pair of electrodes addresses at least one of said adjacent regions;

wherein incident polarized light passing through a first surface and said regions undergoes a phase change; and wherein said first surface of said electro-optic material and a second surface of said electro-optic material are both transparent.

61. A grating modulator array for providing modulated phase fronts to incident light thereon comprising:

an electro-optic material;

a plurality of modulator sites comprising:

a plurality of adjacent regions within said electro-optic material defined by application of an electric field;

a plurality of pairs of electrodes on opposite surfaces of said electro-optic material wherein each pair of electrodes addresses at least one of said adjacent regions;

wherein incident polarized light passing through a first surface and said regions undergoes a phase change; and said electrode pairs is addressed with pulse width modulation.

62. A grating modulator array for providing modulated phase fronts to incident light thereon comprising:

an electro-optic material;

a plurality of modulator sites comprising:

a plurality of adjacent regions within said electro-optic material defined by application of an electric field;

a plurality of pairs of electrodes on opposite surfaces of said electro-optic material wherein each pair of electrodes addresses at least one of said adjacent regions;

wherein incident polarized light passing through a first surface and said regions undergoes a phase change; and wherein a spatial filter creates a fourier transfer plane which translates said phase change into spatial intensity variations.

63. A grating modulator array as in claim 62 wherein said spatial filter is a non-linear material.

64. A grating modulator array for imparting a phase change to light incident on a top surface of said grating modulator array comprising:

an electro-optic material;

a plurality of modulator sites comprising:

a plurality of regions within said electro-optic material; and a plurality of electrode pairs on opposing side surfaces of said electro-optic material wherein each of said plurality of electrode pairs addresses at least one of said regions; and wherein a bottom surface of said electro-optic material is coated with a reflective layer such that the incident light is reflected back through said electro-optic material and said regions.

65. A grating modulator array as in claim 64 wherein each of said regions is parallel to an adjacent region.

66. A grating modulator array as in claim 64 wherein each of said regions is parallel to a first axis and said modulator sites form a row parallel to a second axis wherein said second axis is at an angle relative to the first axis.

67. A grating modulator array as in claim 64 wherein incident light in non-normal to a top surface of said electro-optic material.

68. A grating modulator array as in claim 64 wherein each of said pairs of electrode addresses all of said regions within a single modulator site.

69. A grating modulator array as in claim 64 wherein a top surface and a bottom surface of said electro-optic material is each covered with an anti-reflection coating.

70. A grating modulator array as in claim 64 wherein individual modulator sites are addressed at more than one of voltage.

71. A grating modulator array as in claim 64 wherein said electro-optic material is selected from a group comprised of lithium niobate, lithium tantalate, and barium titanate.

72. A grating modulator array for imparting a phase change to light incident on a top surface of said grating modulator array comprising:

an electro-optic material;

a plurality of modulator sites comprising:

a plurality of regions within said electro-optic material;

a plurality of electrode pairs on opposing side surfaces of said electro-optic material wherein each of said plurality of electrode pairs addresses at least one of said regions; and wherein a bottom surface of said electro-optic material is transparent wherein incident light is transmitted through said electro-optic material.

73. A grating modulator array for imparting a phase change to light incident on a top surface of said grating modulator array comprising:

an electro-optic material;

a plurality of modulator sites comprising:

a plurality of regions within said electro-optic material;

a plurality of electrode pairs on opposing side surfaces of said electro-optic material wherein each of said plurality of electrode pairs addresses at least one of said regions; and wherein at least one of said pairs of electrodes is addressed with pulse width modulation.

74. A laser printer for printing on a light sensitive media comprising:

a laser array comprised of a plurality of laser diode emitters each of which emits a beam of light;

illumination optics comprising cross array components and array direction components for reducing divergence of said light beams;

an array direction illumination optics for merging said light beams from said plurality of laser diode emitters, and for flood illuminating a grating modulator array with said merged and reduced light beams;

a control means connected to said grating modulator array for individually controlling modulation of modulator sites on said grating modulator array for imparting a phase change to said merged light beams; and an imaging lens which directs light from said grating modulator array onto said light sensitive media, comprised of:

a first lens element which converts said merged light into diffracted and undiffracted light at a Fourier plane;

a spatial filter in close proximity to said Fourier plane, which discriminates between said diffracted and said undiffracted light; and a second lens element which reconstructs an image of said modulator sites.

75. A laser printer as in claim 74 wherein said grating modulator array consists of a row of adjacent modulator sites.

76. A laser printer as in claim 72 wherein said modulator sites are oriented at a skew angle such that said merged light beams are diffracted at an intermediate direction between said cross array direction and said array direction.

77. A laser printer as in claim 74 wherein each of said modulator sites is comprised of individual diffraction gratings and said diffraction gratings are oriented to diffract said merged light beams into said cross array direction.

78. A laser printer as in claim 74 wherein said modulator sites are comprised of an electro-optic material.

79. A laser printer as in claim 74 wherein said modulator sites are comprised of a plurality of adjacent periodically poled regions.

80. A laser printer as in claim 74 wherein said array direction illumination optics is comprised of at least one fly's eye integrator.

81. A laser printer for printing to a media comprising:
- a laser array comprised of a plurality of laser diode emitters each of which emits a beam of light;
- an illumination optics comprised of:
  - a cross array illumination optics for reducing divergence of each of said light beams;
  - a lenslet array wherein each lenslet element of said lenslet array receives a light beam from each laser diode emitter; and
  - at least one fly's eye integrator for providing spatially and angularly homogenized uniform flood illumination to a grating modulator array;
- a control means connected to said grating modulator array for individually controlling a plurality of modulator sites on said grating modulator array; and
- an imaging lens which directs light from said grating modulator array onto said media, comprised of:
  - a first lens element which diffracts said merged light to a Fourier plane;
  - a spatial filter in close proximity to said first lens element, which discriminates between diffracted and undiffracted light; and
  - a second lens element which reconstructs an image of said modulator sites.

82. A laser printer as in claim 81 wherein said grating modulator array comprises a row of adjacent modulator sites.

83. A laser printer for printing on a media comprising:
- a laser which emits a beam of light;
- illumination optics for directing said beam of light onto a grating modulator array;
- a control means connected to said grating modulator array for individually controlling modulation of modulator sites on said grating modulator array thereby generating diffracted or undiffracted light from each of said modulator sites depending on control signals sent to said modulator site;
- an imaging lens which directs light from said grating modulator array along an optical axis of said imaging lens and onto said media, comprised of:
  - a first lens element which diffracts said merged light to a Fourier plane;
  - a spatial filter in close proximity to said first lens element, which discriminates between diffracted and undiffracted light; and
  - a second lens element which reconstructs an image of said modulator sites.

84. A laser printer as in claim 83 wherein each of said modulator sites comprise a diffraction grating which are oriented such that they diffract said light in a direction at a predetermined angle to a plane common to said grating modulator array and said optical axis.

85. A laser printer as in claim 83 wherein the grating modulator array is comprised of a electro-optic material.

86. A laser printer as in claim 83 wherein said grating modulator array is comprised of a electro-optic material and said plurality of modulator sites is comprised of a plurality of adjacent periodically poled regions.

* * * * *